US008045947B2

(12) United States Patent
Mandal et al.

(10) Patent No.: US 8,045,947 B2
(45) Date of Patent: *Oct. 25, 2011

(54) RF POWER EXTRACTING CIRCUIT AND RELATED TECHNIQUES

(75) Inventors: Soumyajit Mandal, Cambridge, MA (US); Rahul Sarpeshkar, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 909 days.

This patent is subject to a terminal disclaimer.

(21) Appl. No.: 11/609,060

(22) Filed: Dec. 11, 2006

(65) Prior Publication Data

US 2007/0087719 A1 Apr. 19, 2007

Related U.S. Application Data

(63) Continuation-in-part of application No. 10/944,676, filed on Sep. 17, 2004, now Pat. No. 7,167,090.

(51) Int. Cl.
*H04B 1/10* (2006.01)

(52) U.S. Cl. ........................................ 455/299; 455/73

(58) Field of Classification Search .................... 455/73, 455/299

See application file for complete search history.

(56) References Cited

U.S. PATENT DOCUMENTS

| | | | | |
|---|---|---|---|---|
| 2,272,401 | A * | 2/1942 | Chaffee | 455/210 |
| 2,397,645 | A * | 4/1946 | Brown | 343/852 |
| 2,493,569 | A * | 1/1950 | Brown, Jr. | 343/743 |
| 3,098,971 | A * | 7/1963 | Richardson | 455/19 |
| 3,808,561 | A | 4/1974 | Sullivan et al. | |
| 4,360,741 | A * | 11/1982 | Fitzsimmons et al. | 307/151 |
| 4,706,182 | A * | 11/1987 | Masuda | 363/139 |
| 5,870,031 | A * | 2/1999 | Kaiser et al. | 340/10.34 |
| 5,920,129 | A * | 7/1999 | Smith | 307/64 |
| 6,008,508 | A * | 12/1999 | Bergemont et al. | 257/175 |
| 6,140,924 | A * | 10/2000 | Chia et al. | 340/572.5 |
| 6,212,431 | B1 | 4/2001 | Hahn et al. | |
| 6,271,796 | B1 * | 8/2001 | Itoh et al. | 343/702 |
| 6,346,922 | B1 * | 2/2002 | Proctor et al. | 343/795 |
| 6,400,274 | B1 | 6/2002 | Duan et al. | |
| 6,486,776 | B1 | 11/2002 | Pollack et al. | |
| 6,639,459 | B1 | 10/2003 | Devilbiss | |
| 6,693,599 | B1 | 2/2004 | Chia et al. | |
| 2003/0102961 | A1 | 6/2003 | Fischer et al. | |
| 2005/0082636 | A1 | 4/2005 | Yashima et al. | |
| 2006/0197668 | A1 * | 9/2006 | Oliver et al. | 340/572.4 |

FOREIGN PATENT DOCUMENTS

WO WO 03/044892 5/2003

* cited by examiner

*Primary Examiner* — Lana N Le
*Assistant Examiner* — Hsin-Chun Liao
(74) *Attorney, Agent, or Firm* — Daly, Crowley, Mofford & Durkee, LLP

(57) ABSTRACT

In one aspect, the invention is a far-field power extraction circuit which includes an integrated antenna and impedance matching portion and a rectifier portion. The antenna and impedance matching portion includes an antenna configured to be responsive to a propagating electromagnetic signal and which provides a resonant response at a resonant frequency. In response to the electromagnetic signal, the antenna provides an electromagnetic output signal at an antenna port. The antenna and impedance matching portion is configured to match an antenna impedance with a remainder of the far-field power extraction circuit including the rectifier portion of the power extraction circuit coupled to the antenna and impedance matching portion. The rectifier is configured to rectify the electromagnetic output signal provided by the antenna to produce a direct current (DC) voltage at an output of the rectifier.

8 Claims, 19 Drawing Sheets

RF POWER EXTRACTING CIRCUIT AND RELATED TECHNIQUES

RELATED APPLICATION

The application claims priority to and is a continuation-in-part application of application Ser. No. 10/944,676 filed on Sep. 17, 2004, now U.S. Pat. No. 7,167,090 and entitled "FAR-FIELD RF POWER EXTRACTION CIRCUITS AND SYSTEMS" which is incorporated herein in its entirety, and the present application is assigned to the assignee of the parent application.

FIELD OF THE INVENTION

The present invention relates generally to power extraction and more particularly to circuits and systems for extracting power from radio frequency (RF) signals.

BACKGROUND OF THE INVENTION

Devising efficient methods for extracting direct current (DC) power from electromagnetic radiation has become an important necessity for a number of applications involving self-powered devices, such as Radio Frequency Identification (RFID) tags and bionic implants. The operating range of such self-powered devices has been severely limited by the failure of existing power extraction techniques to successfully extract power from radio frequency (RF) signals having relatively low power levels. The problem of extracting DC power from electromagnetic radiation has two basic parts: collecting the incident radiated power, and then converting the collected power to DC signals which are usable by the self-powered devices.

Converting RF energy from RF signals at different frequencies to DC power is a relatively difficult problem particularly when the RF signals have relatively low power levels. Fundamentally, this problem arises because frequency conversion is generally a nonlinear operation, (i.e., it is necessary to operate in the non-linear region of a non-linear device). Practical systems, however, operate at relatively low RF power levels which results in operation in the linear region of non-linear devices. In addition, nonlinear devices normally used for rectification have exponential nonlinearities with relatively large "dead zones" near the origin, i.e., nonlinear devices can be non-responsive in response to signals having voltage and current levels which are close to zero. Severe constraints can also be imposed when it is desirable to provide a self-powered device which is relatively inexpensive and environmentally robust. Such cost and environmental limitations preclude the use of exotic devices and structures.

SUMMARY OF THE INVENTION

In one aspect, the invention is a far-field power extraction circuit which includes an integrated antenna and impedance matching portion and a rectifier portion. The antenna and impedance matching portion includes an antenna configured to be responsive to a propagating electromagnetic signal and which provides a resonant response at a resonant frequency. In response to the electromagnetic signal, the antenna provides an electromagnetic output signal at an antenna port. The antenna and impedance matching portion is configured to match an antenna impedance with a remainder of the far-field power extraction circuit including the rectifier portion of the power extraction circuit coupled to the antenna and impedance matching portion. The rectifier is configured to rectify the electromagnetic output signal provided by the antenna to produce a direct current (DC) voltage at an output of the rectifier.

In another aspect, the invention is a far-field power extraction circuit that includes an antenna and a multi-stage rectifier coupled to the antenna. The multi-stage rectifier is configured to rectify an electromagnetic signal provided thereto by the antenna to produce a direct current (DC) voltage at an output of the rectifier. The multi-stage rectifier includes two or more stages, and at least one circuit element having a nonlinear capacitive characteristic.

DETAILED DESCRIPTION OF THE INVENTION

Included herein are various combinations of different circuits and techniques to efficiently extract power from electromagnetic signals having relatively low electromagnetic field strengths, thereby substantially reducing the power threshold required for operation of self-powered devices.

Figure 1:
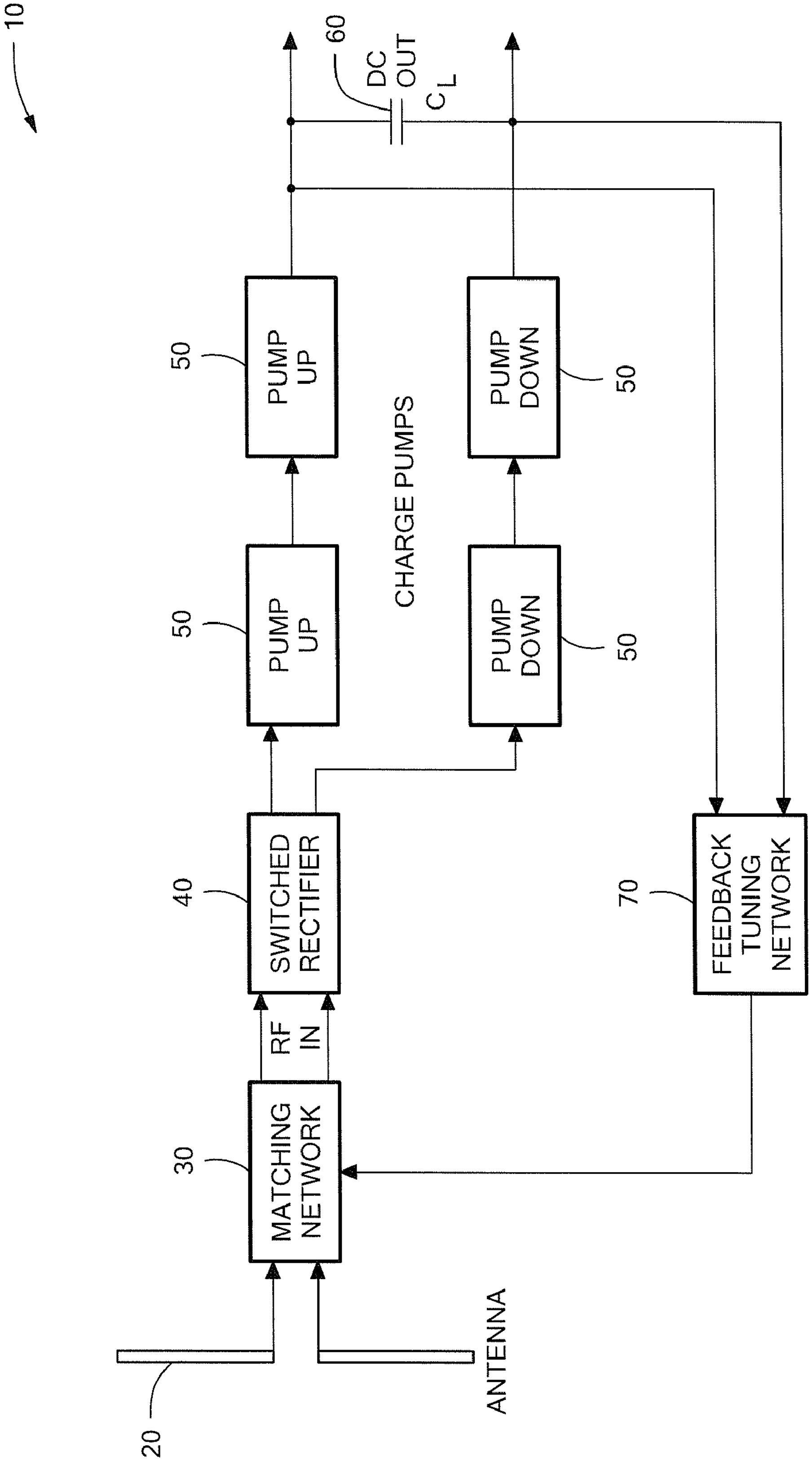
FIG. 1 is a block diagram of an example of a power extraction system.

Referring to FIG. 1, a block diagram of a system 10 for extracting power from electromagnetic radiation includes an antenna 20 for receiving a radio frequency (RF) signal from which direct current (DC) power will be harvested. A matching network 30 is coupled to the antenna 20 to impedance match the antenna 20 to the remainder of the system, thereby obtaining efficient power transfer. A switched rectifier 40 operates on the impedance matched differential RF signal and converts the signal to one or more DC levels. The output of the switched rectifier 40 is coupled to a group of charge pumps 50, which increase the DC levels of the voltage. The output of the charge pumps is coupled across a load capacitor 60 to provide the DC output voltage. A feedback tuning circuit 70 is coupled to the output voltage and feeds into the impedance matching network 30 to provide continuous tuning of the impedance matching network to get the maximum possible DC output.

Figure 2:
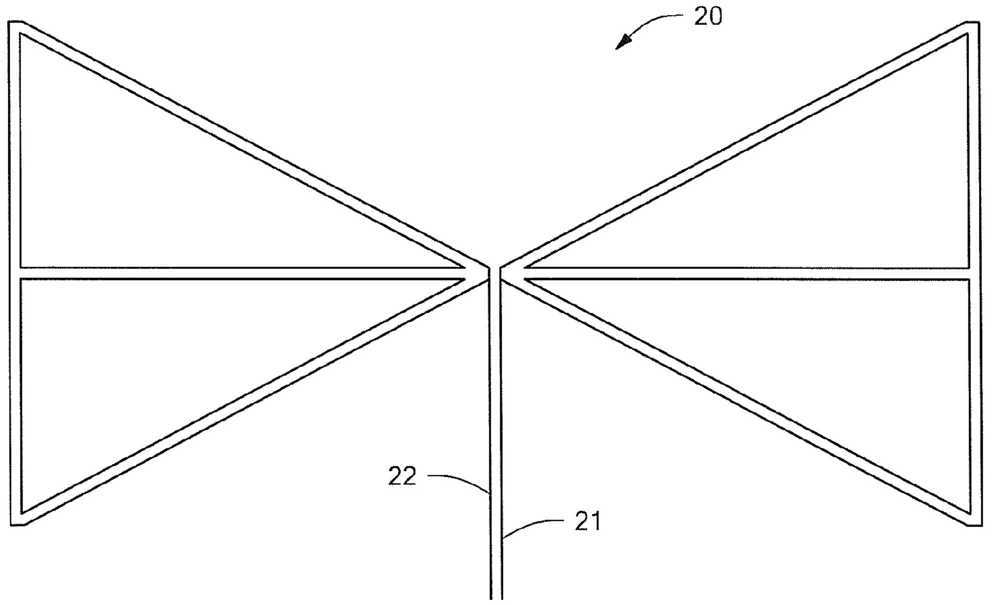
FIG. 2 is a diagram of a broadband planar dipole antenna.

Referring to FIG. 2, the antenna 20 is shown, The antenna bandwidth is defined as the frequency range over which the reflection coefficient of the antenna into a specified load impedance is less than some specified value, typically −10 dB (VSWR=2). This antenna has improved bandwidth over a simple linear dipole, while occupying approximately the same area. In one embodiment the antenna 20 includes a wideband dipole antenna.

It should be appreciated that although a particular dipole antenna design is shown in FIG. 2, it may be desirable to provide the antenna as a planar loop (e.g., see FIG. 13), dipole or fractal antenna. In one embodiment, the antenna 20 is provided on a flexible substrate. One objective for power collection applications is to provide a planar antenna on a flexible substrate that produces the maximum possible open circuit voltage $V_{OC}$ across the antenna terminals 21 and 22 for a given incident field strength. In addition, the antenna 20 has sufficient bandwidth to withstand bending and proximity effects, such as attachment to a dielectric surface, without moving too far off resonance. Since passive RFID systems typically use backscatter modulation to communicate with a tag reader, another factor of interest is optimization of the Radar Cross Section (RCS) modulation capabilities of the antenna.

To address these issues, the use of one or more of planar loop, dipole, bow-tie and fractal antennas is presented. Loop antennas are advantageous because most proximity (near field) effects in practice are caused by dielectric materials. Since the near field energy of loop antennas is primarily stored in the magnetic field, they are typically less susceptible to these effects than other antenna types. Bow-tie antennas are desirable when a large impedance matching bandwidth is desired, but typically require large amounts of area in order to achieve this bandwidth. Fractal antenna structures are of interest in this application since they allow the bandwidth to be increased without consuming more area, or by reducing the area required to achieve a given bandwidth. Photonic Band Gap (PBG) substrates which reduce losses due to surface wave propagation in the flexible substrate may also be utilized. PBG substrates have electrical properties (like dielectric constants) which are periodic functions of space. Solutions of Maxwell's equations in such a medium have a 'stop band,' or forbidden frequency range, where no surface wave propagation is possible. This may be utilized in our application by making the stop band lie in the frequency range where the main surface wave modes propagate, thereby preventing energy loss due to such (undesirable) modes and improving the efficiency of power extraction.

Figure 3:
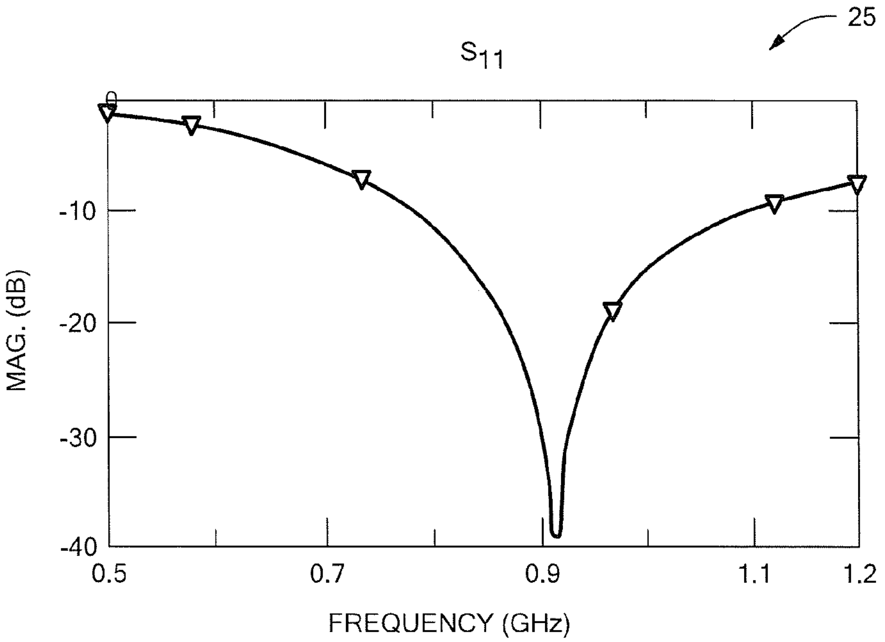
FIG. 3 is a graph of voltage reflection coefficient vs. frequency at an input port of the broadband planar dipole antenna shown in FIG. 2.

Referring to FIG. 3, a graph 25 of a simulated reflection characteristic for the antenna 20 is shown. In graph 25, $S_{11}$ is the reflection coefficient of the antenna and the substrate material used for simulations was FR-4. When simulated with a commercially available Method of Moments (MoM) based field solver, and using a criteria of a voltage standing wave ratio (VSWR) of two (VSWR≦2) this antenna 20 exhibited a fractional bandwidth of approximately 40% at a center frequency of about 900 MHz. In this implementation, the antenna occupied an area of approximately 5"×2.5".

Another technique used in performing far-field RF power extraction includes utilizing package parasitics to increase the input voltage levels to the rectifier. The far field case, when the input amplitude of the RF signal is not large enough to efficiently operate typical rectifying devices such as Schottky diodes, are of particular interest. To overcome this problem, the high-Q input-matching network 30 is used to passively amplify the input RF voltage. The inductance L and capacitance characteristics C(V) of network 30 are adjusted to include the effects of parasitic inductances and capacitances introduced by the chip packaging. In this way, a use for these normally unwanted parasitic characteristics has been found, as they now function as part of the matching network 30. Of course, increasing the Q also decreases the frequency range over which the system can operate and increases its sensitivity to environmental conditions, which cause the resonant frequency to drift with time. This necessitates the use of active resonant frequency control. This is implemented by the feedback-tuning network 70 depicted in FIG. 1.

Another technique used in performing far-field RE power extraction includes using traveling wave architectures for distributed voltage amplification and rectification. The matching network 30 is provided having both high voltage gain and high bandwidth at the input of the rectifier by using a cascade of exponentially tapered inductor-resistor-capacitor (L-R-C) transmission line segments. Each segment acts like a low pass filter with a certain Q and cutoff frequency. All segments have essentially the same Q, but have exponentially tapering cutoff frequencies. The cutoff frequency of the n-th section is given by:

$$f_n = \exp(-n/N_{nat})$$

where $f_n$ and $N_{nat}$ are constants. Such a technique is useful for attaining high gain from many low-gain stages.

Figure 4:
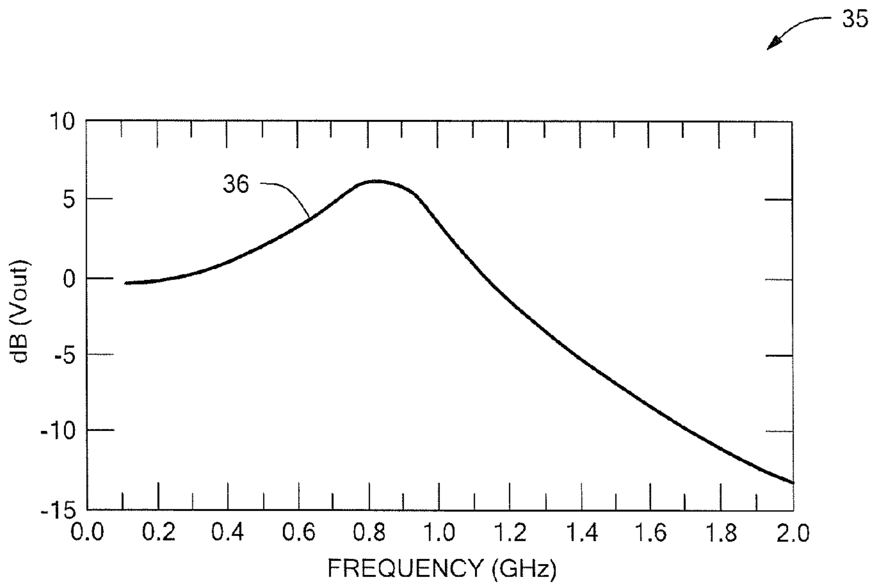
FIG. 4 is an exemplary graph of rectifier output voltage ($V_{out}$) vs. frequency at the output of the input-matching network of FIG. 1.

Referring to FIG. 4, a graph 35 depicts the alternating current (AC) transfer characteristic of the input matching network 30 for a loaded Q of 2 and a resonant frequency of 900 MHz. The curve shows that a maximum output is achieved at approximately 900 MHz. The input to the matching network 30 is assumed to be the antenna 20, and its output is fed to the switched rectifier 40.

Figure 5:
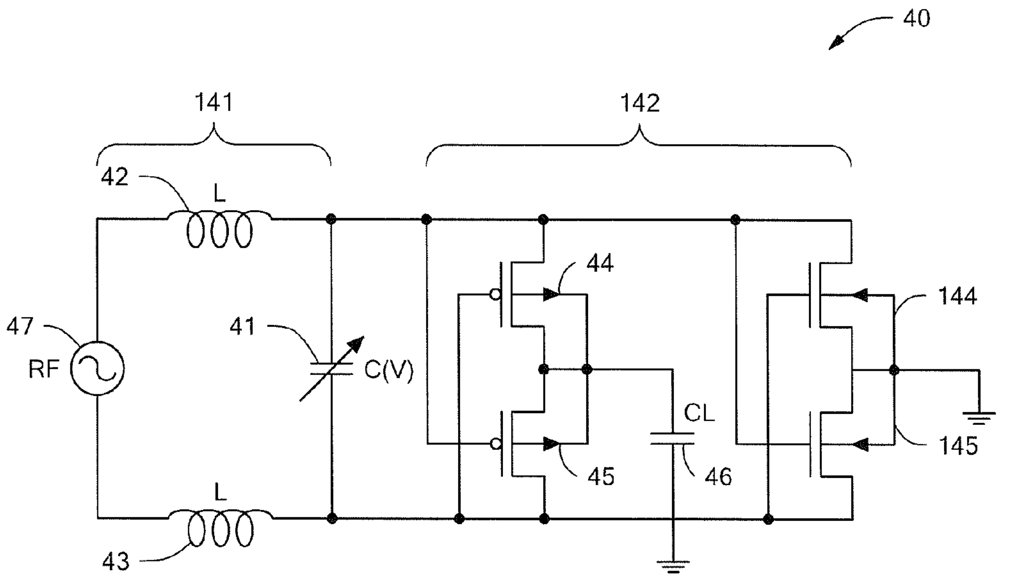
FIG. 5 is a schematic diagram of a rectifier circuit.

Referring to FIG. 5, a switched rectifier circuit 40 includes a nonlinear capacitance portion 141 and a transistor portion 142. One aspect for performing efficient power extraction includes using parametric-amplifier-like topologies and capacitive nonlinearities for rectification instead of exponential resistive nonlinearities. Exponential resistive nonlinearities (e.g., diodes) have traditionally been used for rectification but are unsuitable at low power levels. To solve this problem, parametric-amplifier-like topologies and capacitive nonlinearities are used (e.g., non-linear capacitors).

The non-linear capacitance portion 141 includes a nonlinear capacitor (e.g., a varactor) 41 used for rectification. The varactor 41 (which can be a reverse-biased PN junction or a Metal Oxide Semiconductor (MOS) capacitor) has a capacitance characteristic C(V), where V is the voltage of the control terminal. V is varied at the same frequency as the input RF signal. The RF signal is applied differentially, and, as an example, V may be tied to the upper plate of the varactor. In that case, C(V) will be different on the positive and negative halves of the RF signal cycle.

Inductors 42 and 43 and varactor 41 form a high-Q circuit and are chosen to resonate at the input frequency for some value of V. Since V varies as the RF, the resonant frequency and gain of the resonator will also be different on the positive and negative halves of the RF cycle. This asymmetric signal gain leads to the development of a DC component $V_{DC}$ of voltage across a load capacitor 46, $C_L$, i.e., rectification.

The power extraction system can be adaptively adjusted for optimal performance by using floating gate transistors as adaptive elements. The threshold voltage of floating gate transistors can be changed by adding or subtracting charge from the floating gate. A lower threshold voltage improves the performance of the switched rectifier and charge pumps described in the following sections by increasing the rectified current for a given input RF amplitude.

In addition, the highest Q that can be used for the input LC tank shown in FIG. 2 is limited by resonant frequency variations caused by environmental factors and manufacturing tolerances. This limits the passive voltage gain obtainable from the tank. To overcome this problem, a high-Q system which maintains a constant resonant frequency by adapting the C(V) characteristic appropriately is utilized. This can be done by using a floating gate MOS capacitor for C(V).

Still another technique for performing far-field RF power extraction requires using rectifiers to avoid voltage drops associated with diode rectifiers. By using the differential RF inputs to operate transistors as switches and not as diodes, the threshold voltage drop associated with diode rectifiers is reduced considerably. The transistor portion 142 includes the p-type Metal Oxide Semiconductor (PMOS) transistor 44, a PMOS transistor 45, an n-type Metal Oxide Semiconductor (NMOS) 144, an NMOS transistor 145 and a load capacitor $C_L$ 46. When the phase of the RF input is such that gate of the PMOS transistor 44 is low, it turns on, drawing current from the high side of the RF input, thereby charging the load capacitor 46. The PMOS transistor 45 is off during this phase. During the opposite RF phase, the roles of the two transistors 44, 45 are reversed, but the load capacitor $C_L$ 46 is still charged upwards. The circuit thus acts as a full wave rectifier and charges the load capacitor $C_L$ 46 towards the positive envelope of the input RF voltage $V_{RF}\sin(\omega t)$. The final rectified DC voltage is determined by the resistance of the transistors and the load resistance connected to the output. It should be evident that by replacing the PMOS transistors 44, 45 with NMOS transistors, the charging direction of the load capacitor can be reversed, i.e., charge can be made to flow out of the load capacitor, thereby decreasing the output voltage. Thus by adding a pair of NMOS transistors 144, 145 in parallel with the PMOS transistors 44 and 45, a negative voltage (referenced to the common-mode voltage of the RF input) is generated, giving a total output DC voltage of approximately $2V_{RF}$. MOSFET devices, being bidirectional devices, are ideally suitable for this circuit, where they are operated as switches. This makes the integrated implementation of the circuit using standard low cost IC fabrication processes, such as complementary metal-oxide-semiconductor (CMOS), feasible.

Figure 6:
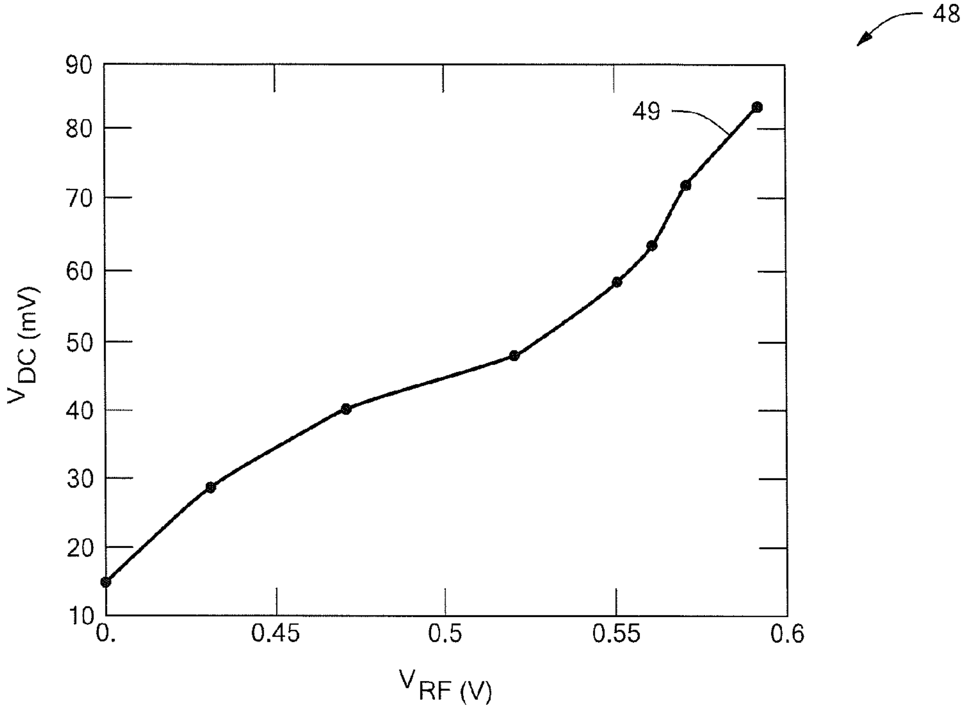
FIG. 6 is an exemplary graph of DC voltage vs. RF voltage for the rectifier circuit shown in FIG. 5.

FIG. 6 depicts a graph 48 depicting a simulated rectification curve 49 for the nonlinear capacitance when it was implemented as a MOS capacitor in a 0.5 μm CMOS process. The RF input amplitude was $V_{RF}$ at 900 MHz. It can be shown that if the MOS devices operate in the sub-threshold region, this technique, which works by parametrically modulating the capacitance of a nonlinear capacitor 41, allows the DC current charging the load capacitor $C_L$ 46 to increase by a factor of cosh $$\left(\frac{\kappa V_{DC}}{V_T}\right),$$

where κ is the sub-threshold body bias coefficient and the thermal voltage, $$V_T = \frac{kT}{q}.$$

Figure 7:
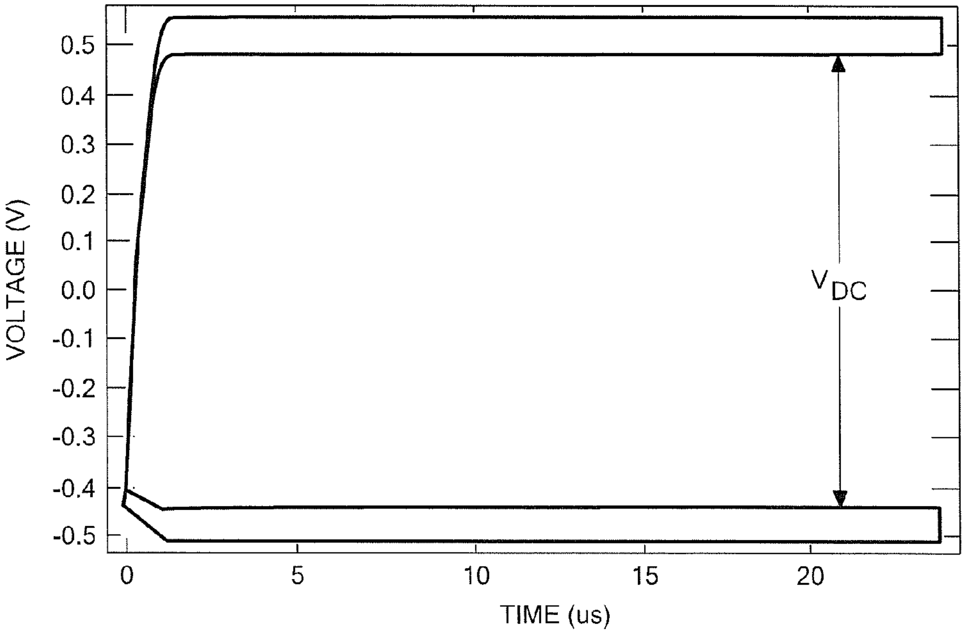
FIG. 7 is an exemplary graph of voltage vs. time of the rectifier circuit of FIG. 5 in response to an input RF signal having a peak-to-peak amplitude of 0.5 V.

FIG. 7 shows the results of a SPICE simulation 140 of the switched rectifier implemented in a 0.5 μm CMOS process with Width/Length=300 for both PMOS and NMOS devices. The input RF voltage amplitude $V_{RF}$ was 0.5 V at 900 MHz. The charging time for a load capacitance $C_L$=50 pF was 1 μs.

Another technique for performing far-field RF power extraction uses charge pumps to increase the rectified output voltage. Since the input RF amplitude is extremely low (insufficient to operate the circuitry needed by the tag), charge pumps are used to increase the output DC voltage.

Figure 8:
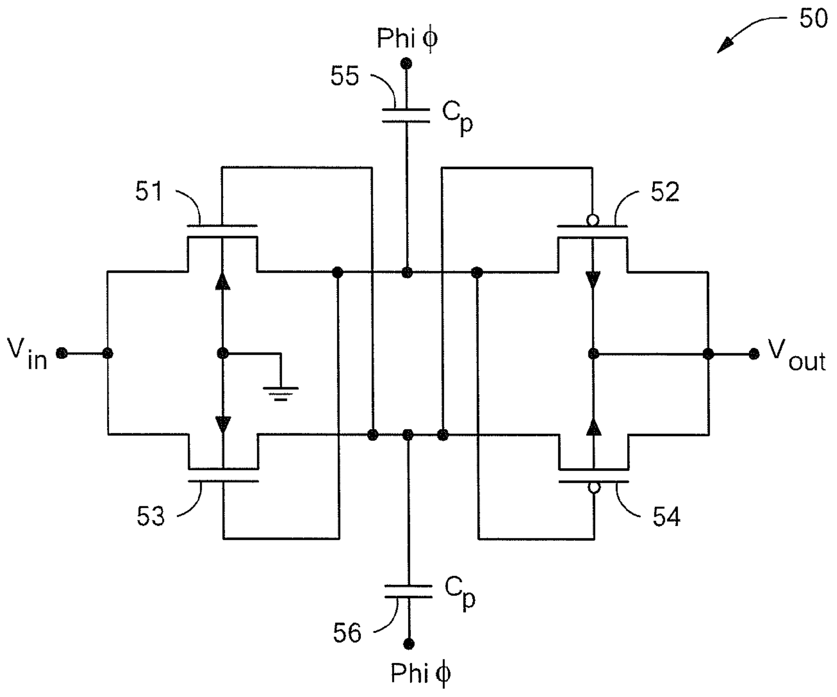
FIG. 8 is a circuit diagram of an example of a four-transistor complementary metal-oxide-semiconductor (CMOS) cell.

FIG. 8 depicts a single CMOS cell 50 using cross-coupled charge transfer switches. The differential RF input voltages $\phi$ and $\bar{\phi}$ are used to pump charge unilaterally through the pump capacitors $C_P$, 55, 56 thus making $V_{OUT}>V_{IN}$. When $\phi$ is high (=$V_{RF}$ this case), the bottom PMOS transistor 54 and the upper NMOS transistor 51 are turned on, while the other two transistors (PMOS transistor 52 and NMOS transistor 53) are turned off. The other end of the pump capacitor connected to $\phi$ is charged to its previous value (=$V_{IN}$)+$V_{RF}$. Current flows through the PMOS transistor 54 from this node, charging up the output towards (approximately) $V_{IN}+V_{RF}$. At the same time, the upper NMOS transistor 51 charges the other end of the pump capacitor connected $\bar{\phi}$ to $V_{IN}$ The whole procedure is repeated during the opposite phase, when the RF input polarities are reversed. During this phase, the upper PMOS transistor 52 and the lower NMOS transistor 53 turn on, the other two transistors 51 and 54 turn off and the output is again charged towards $V_{IN}+V_{RF}$.

Ideally, $V_{OUT}=V_{IN}+V_{RF}$, i.e., a single cell acts as a voltage adder e.g., it adds the RF amplitude to the input voltage. By cascading N of these cells in series, the output voltage is increased under no load conditions to $(N)V_{RF}$ where the input voltage to the first cell is assumed to be at ground. Practically, parasitic capacitances to ground at the charge pumping nodes and increasing body bias effects on the NMOS devices limit the available voltage gain. This assumes that a typical n-well CMOS process is being used. This limitation can be removed if a more expensive dual-well process is used instead. In addition, by reversing the input and output terminals, the same circuit can be used to pump charge in the reverse direction and thereby generate large negative voltages. By combining two sets of four transistor cells pumping in opposite directions, an output DC voltage of $2NV_{RF}$ can (ideally) be generated. This technique often provides better performance than cascading 2N upward pumping cells to obtain the same output voltage.

Figure 9:
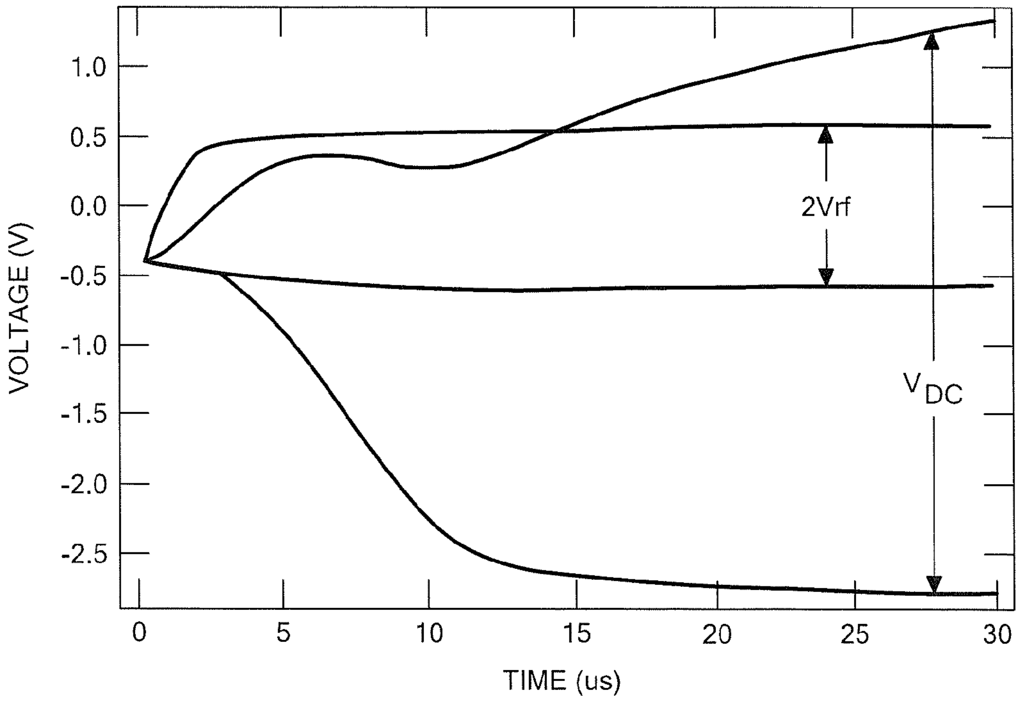
FIG. 9 is an exemplary graph of voltage vs. time illustrating a simulated output of the four-transistor CMOS cell of FIG. 8.

FIG. 9 shows the result of a SPICE simulation 57 of the rectifier 40 of FIG. 5 combined with the charge pump 50 shown in FIG. 8 implemented in a 0.5 μm CMOS process. Width (W)/Length(L)=60 for the devices in the switched rectifier, the pump capacitance $C_p$=1 pF and two cascaded cells were used to pump charge in each direction (N=2). The overall system was similar to that shown in FIG. 1, with $C_L$=10 pF. The input RF amplitude $V_{RF}$ was 0.55 V at 900 MHz.

The apparatus may utilize solar and other sources of ambient power for starting up the power collection module. For best performance, the power collection module can adapt to changing environmental conditions, for example by automatically adjusting the resonant frequency of the antenna using a feedback tuning network (shown in FIG. 1). However, such adaptation loops consume power, which may not be available from the transmitted RE. To ensure startup power to run the adaptation loops, alternative sources of ambient power (apart from the transmitted RE) may be used. The amount of power required from these sources is small (typically in the nano watt range) since the system only needs to adapt slowly (time scale of milliseconds to seconds) and can thus be designed to have very low power consumption. Promising power sources include solar radiation (utilizing light energy using on-chip solar cells), ambient mechanical vibrations (using MEMS transducers), thermal gradients (using thermoelectric materials) and the like.

Figure 10:
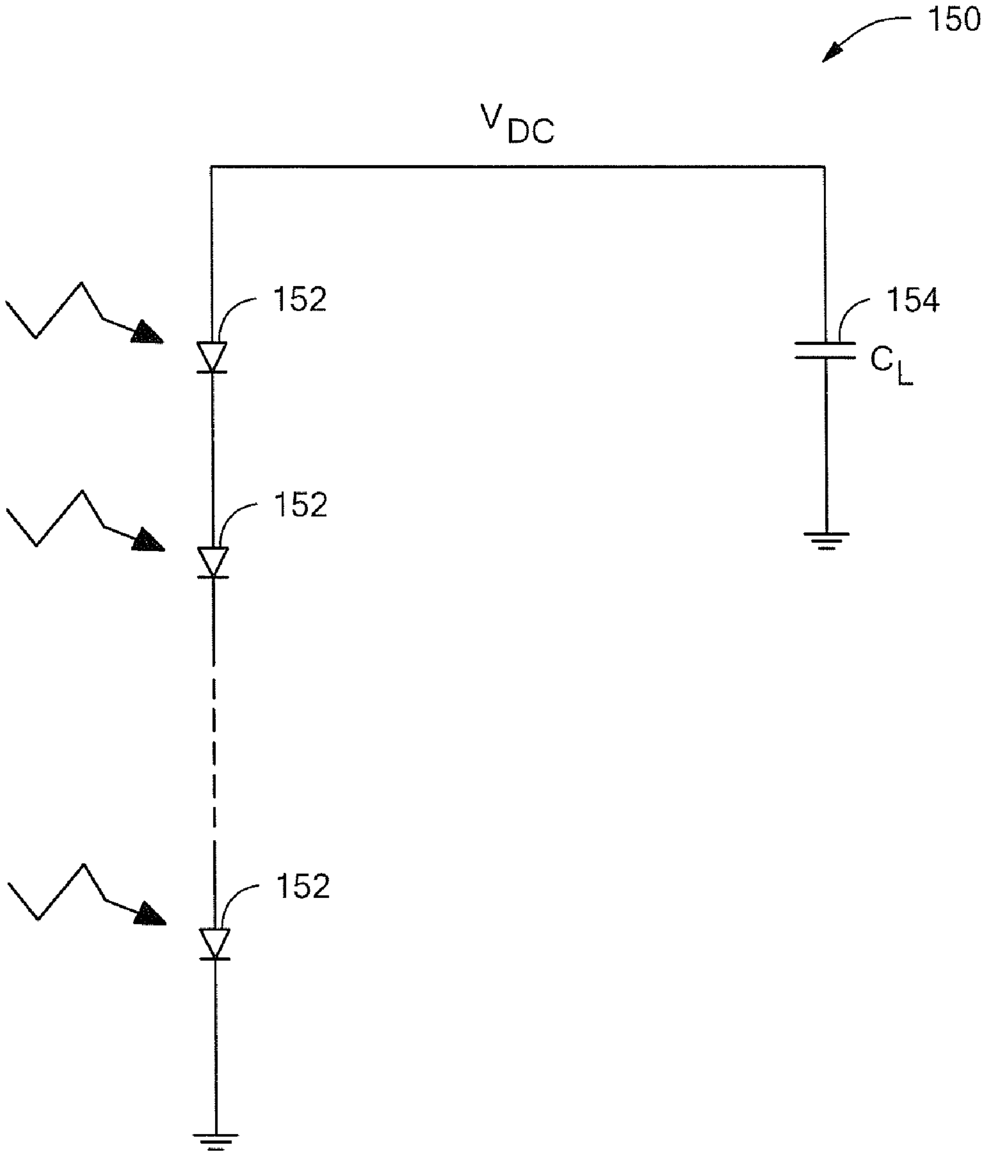
FIG. 10 is a schematic diagram of a solar cell circuit.

FIG. 10 shows a solar cell structure 150 which can be used to provide startup power for the power collection module. The solar cell structure includes three solar diodes 152 (e.g., forward biased junction diodes) in series to charge load capacitor 154, thereby providing a D.C. voltage across the load capacitor 154 when exposed to light.

Figure 11:
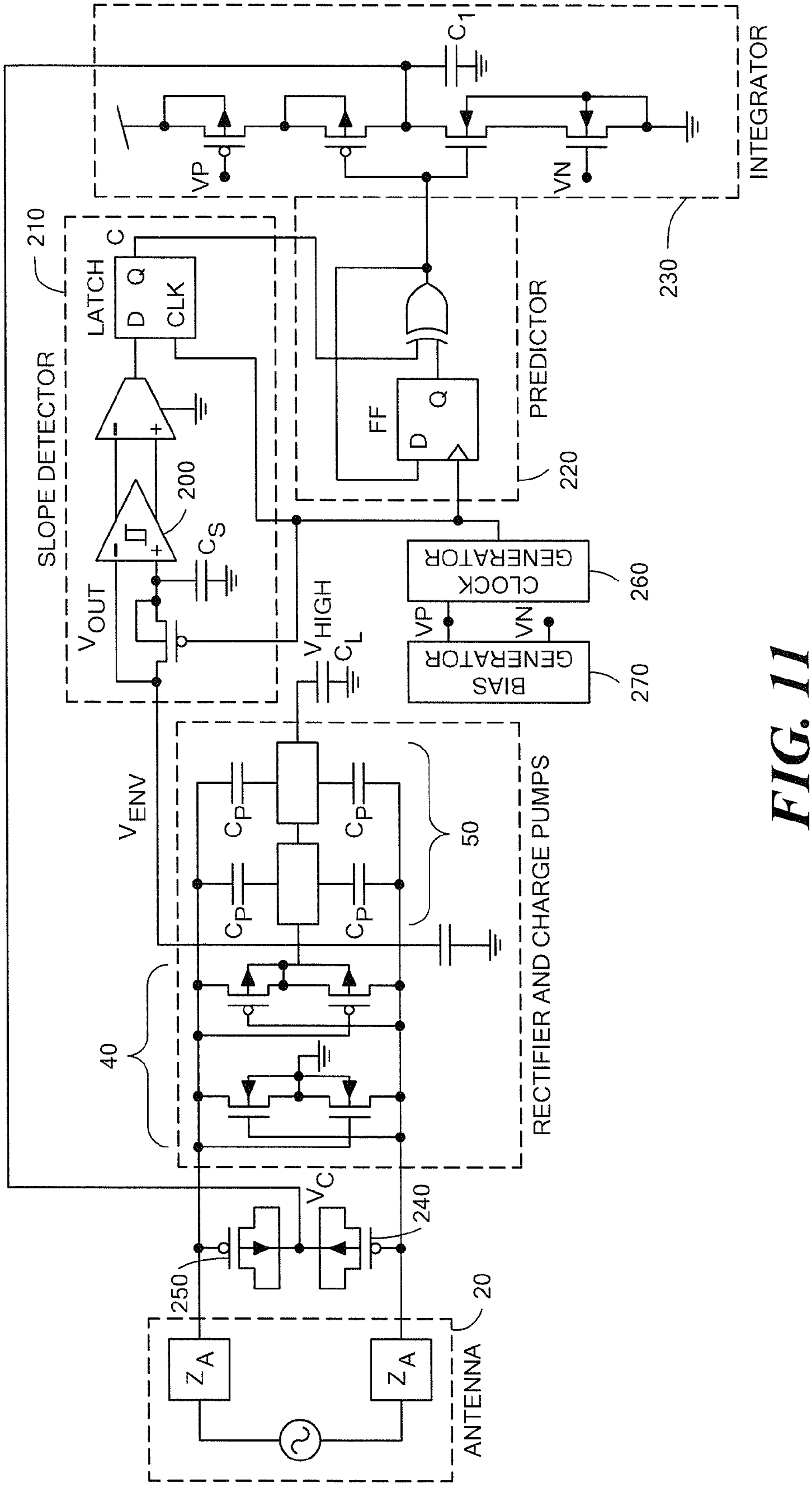
FIG. 11 is a schematic diagram of a controller.

A feedback-tuning network 70 is shown in FIG. 11. The objective is to maximize the output DC voltage of the system, subject to a poorly known and possibly time varying open circuit RF amplitude across the antenna terminals. The primary cause of this is antenna resonant frequency variations. The resonant frequency (and other properties, such as the radiation pattern) of the antenna on the power collection module can vary by significant amounts because of variations in nearby environmental conditions. One way to minimize the effects of this variation is to use a broadband antenna, but this lowers the input Q and decreases the power up range. To prevent this, a feedback controller 70 is used to regulate the antenna resonant frequency (FIG. 11). The controller uses derivative-based control to regulate the antenna resonant frequency. The controller includes a state machine which operates on the temporal derivative of the rectified RF voltage and tries to keep it positive, i.e., increasing in time. The controller outputs a voltage which is used to control the capacitance of a MOS varactor, thereby controlling the resonant frequency of the antenna.

The controller shown in FIG. 11 can be implemented using subthreshold CMOS logic and consumes very little power. The controller can be powered off the rectified RF supply or from an alternative source of ambient energy, such as a solar cell. Two controllers running in different frequency ranges can be used to adapt the resonant frequency to variations that occur on different time scales. For example, a slow control loop could adjust to mechanical movement around the power collection module, while a faster loop could adjust to more rapidly varying quantities, such as multipath fading effects on the received RF signal.

The output of the rectifier ($V_{ENV}$, which is the DC voltage to be maximized) is provided to slope detector 210. Slope detector 210 includes a PMOS device 202 having a source coupled to the output of the rectifier and charge pumps ($V_{ENV}$), a gate coupled to the clock generator 260 and a drain coupled to storage capacitor 200. The storage capacitor 200 is coupled between the drain of PMOS device 202 and a reference ground. A buffer 212 has a first input coupled to the output of rectifier and charge pumps and a second input coupled to the storage capacitor 200. Buffer 212 provides a first buffer output and a second buffer output. A comparator 214 receives the buffer outputs and provides a comparator output. A latch 216 receives the output of comparator 214 and a clock input, and provides the slope detector output. In use, the output of the rectifier and charge pumps is sampled and held on the capacitor $C_S$ 200 of slope detector 210. This value is compared with the actual value of $V_{ENV}$. This operation is a discrete time approximation to the time derivative, and the output C of the slope detector 210 is a 1-bit estimate of the slope of $V_{ENV}$.

A predictor circuit 220 includes a latch 222 receiving a clock input and a data input and providing an output to exclusive-or gate 224. The exclusive-or gate 224 also receives the slope detector output and provides a predictor output which is also coupled to data input of latch In use, the predictor takes the current value of C, combines it with information about the previous correction made to the antenna resonant frequency and generates a control signal. This control signal is fed into an integrator 230.

Integrator 230 includes a PMOS device 232 receiving a positive bias voltage at a gate, having a source coupled to a reference voltage $V_P$ and providing an output at a drain. A second PMOS device 234 has a source coupled to drain of PMOS device 232, a gate coupled to the output of predictor 220 and a drain providing an output of the integrator 230. Integrator 230 further includes an NMOS device 238 receiving a negative bias voltage $V_N$ at a gate, having a source coupled to a reference ground and provides an output at a drain. The second NMOS device 236 has a source coupled to NMOS device 238, a gate coupled to output of predictor 220 and a drain couple dot the drain of PMOS device 234 and also providing an output of integrator 230.

The integrator 230 output voltage $V_C$ controls the antenna resonant frequency by changing the capacitance of the MOS varactors 240, 250 connected across the antenna output terminals. In one implementation that is shown in FIG. 11, the predictor control law is defined as $$\Delta V_{C,n+1}=C\oplus\Delta V_{C,n}$$

where $\Delta V_{C,n+1}$ is the new correction to be made to $V_C$, $\Delta V_{C,n}$ was the previous correction, and ⊕ denotes the logical XOR operation. This control law is that of a simple 'bang-bang' controller. Every time the controller makes a right decision ($V_{ENV}$ increases and its slope C is positive), it repeats it on the next time step. Every time the controller makes a wrong decision ($V_{ENV}$ decreases and its slope C is negative), it reverses its previous decision on the next time step. An oscillator (clock generator) 260 generates the sampling and timing signals for the rest of the system. Necessary current and voltage biases are generated by a bias generator 270. Typically this takes the form of a supply-independent current reference circuit.

Figure 12:
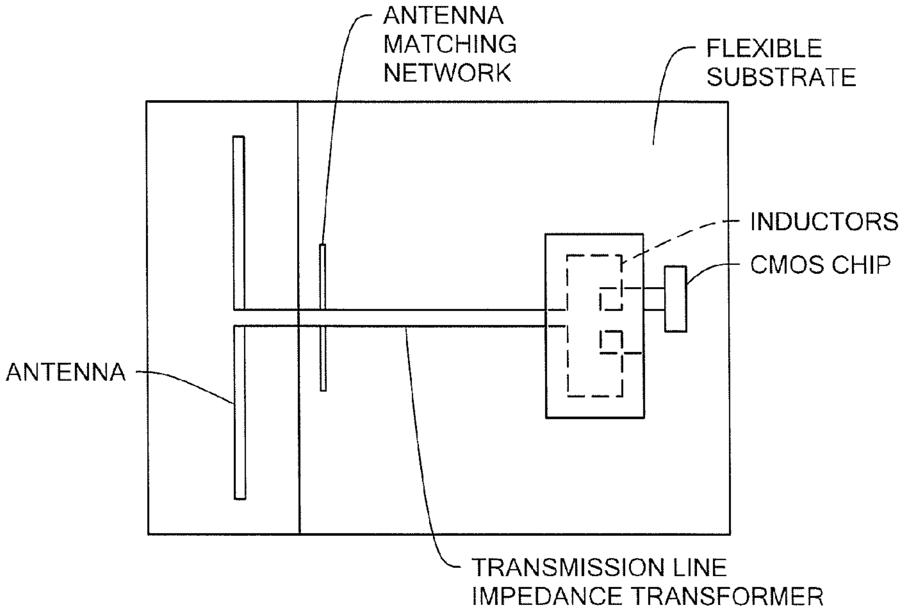
FIG. 12 is a block diagram of a radio frequency (RF) power extraction system.

The physical structure of an RF power extraction system is shown in FIG. 12. The input RF signal is captured by the antenna 20. The antenna impedance is matched to the rest of the system using an appropriate matching networks 30. The signal is then passively amplified using a high-Q resonator and fed to CMOS circuitry 80 which rectifies it and generates one or more DC voltages. These DC voltages are then used for powering other circuits on the chip 80, such as an RFID transceiver. The entire system is disposed on a flexible substrate 90.

Figure 13:
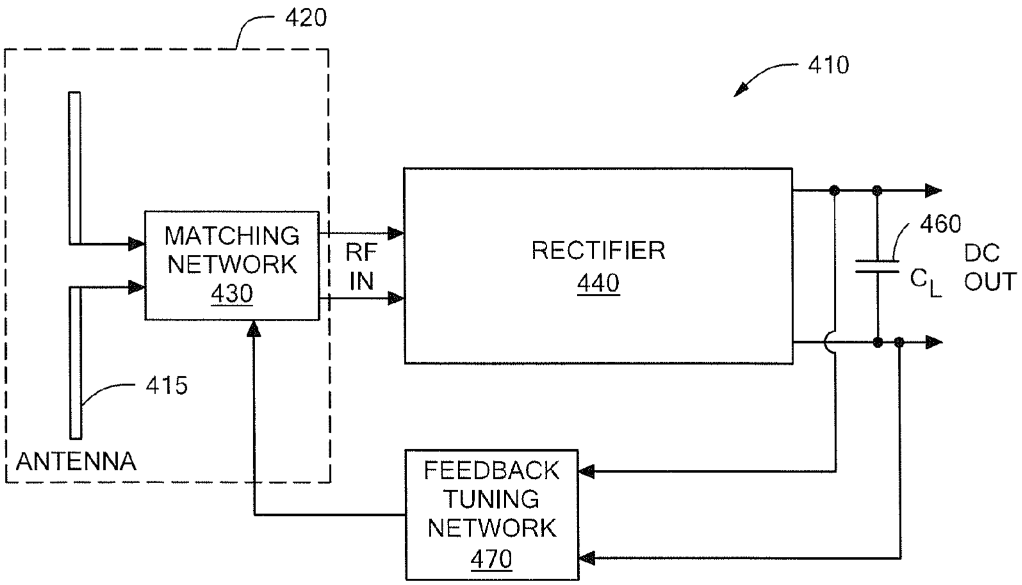
FIG. 13 is a block diagram of another embodiment of a power extraction system.

Referring now to FIG. 13, a block diagram of another example of a system for extracting power from electromagnetic radiation, such as a system 410 includes an antenna system 420 for receiving a radio frequency (RF) signal from which direct current (DC) power will be harvested. The antenna system 420 includes an impedance matching network 430 coupled to an antenna 415. The network 430 impedance matches the antenna 415 to the remainder of the system 410, thereby obtaining efficient power transfer using, for example, a complex conjugate impedance match. As will be described in conjunction with FIG. 14 below, the antenna system 420 may be implemented as a resonant dual planar loop antenna 420 (FIG. 14) which combines the functionality of the antenna 415 and the matching network 430 in an integrated structure.

A rectifier 440, which may include one or more rectifying stages built out of nonlinear elements like diodes and transistors, operates on the impedance matched RF signal fed thereto from matching network 430 and converts the RF signal to one or more DC levels. The output of the rectifier 440 is coupled across a load capacitor 460 to provide the DC output voltage. A feedback tuning circuit 470 is coupled between the output terminals of the rectifier circuit 440 and the matching network 430. The feedback tuning circuit 470 couples a portion of the rectifier output voltage signal to the impedance matching network 430 to provide continuous or discrete time tuning of the impedance matching network. By performing continuous or discrete-time tuning, it is possible to produce, to the maximum DC output for given received RF power level, a DC output which approaches, or in some cases even matches the maximum possible DC outlet.

For some power collection applications, it is desirable to provide a planar antenna on a (possibly) flexible substrate that produces the maximum possible open circuit voltage $V_{OC}$ across the antenna terminals and for a given incident field strength while at the same time the antenna output is impedance matched to the input impedance of the rectifier chip. Matching the antenna output impedance to the rectifier chip input impedance helps to produce a maximum power transfer because rectifying elements are ineffective at low input voltages. Thus, it is desirable to maximize the antenna open circuit voltage $V_{OC}$.

$V_{OC}$ may be maximized by using a high-Q passive network as an upward impedance transformer, but this strategy has limited impedance-matching bandwidth (proportional to 1/Q). In order to improve this trade-off, the functions of RF reception, impedance matching and up-transformation have been combined into a single resonant dual planar loop antenna.

Figure 14:
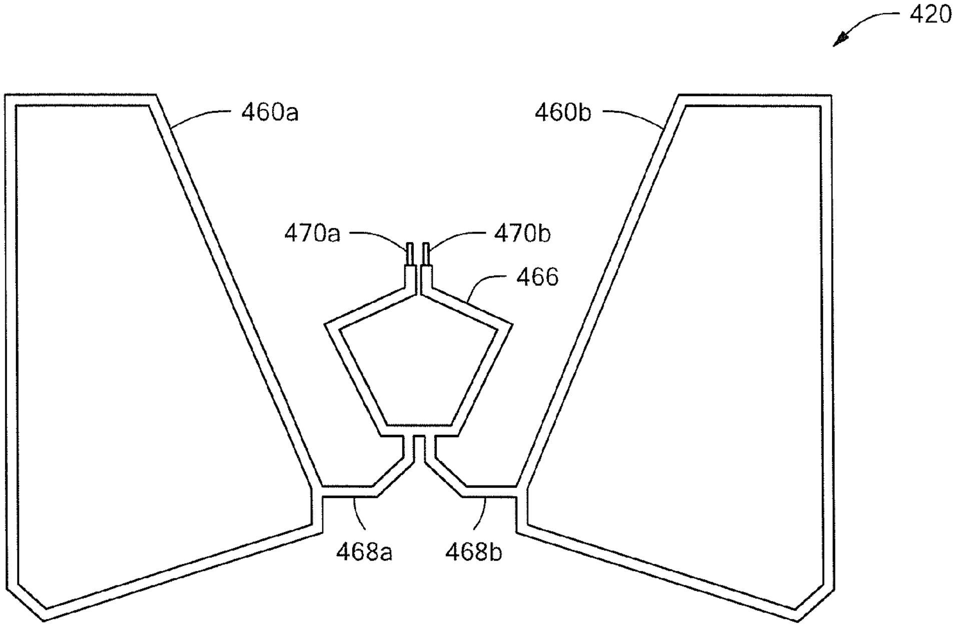
FIG. 14 is a diagram of a planar loop antenna.

Referring to FIG. 14, the resonant dual planar loop antenna 420 includes a plurality of resonant loops (e.g., a resonant loop 460*a* and a resonant loop 460*b*) coupled to an inductive loop 466 through corresponding connectors (e.g., a connector 468*a* and a connector 466*b*). In one embodiment, the antenna 420 is provided on a flexible substrate. Even though, the bandwidth may be increased further (up to a factor of π/2 more than the two-loop case), the incremental benefits of adding more loops levels off quickly. The resonant dual planar loop antenna 420 implements a coupled resonator impedance-matching network between the antenna 420 and the rectifier 440. The antenna 420 acts as one resonant circuit. The perimeters of the resonant loops 460*a*, 460*b* are each half a wavelength long at the resonant frequency. The connectors 468*a*, 468*b* are impedance inverters which are coupled to the inductive loop 466. Loop 466 presents an inductive impedance at terminals 470*a*, 470*b* at the resonant frequency and resonates with the input capacitance of the rectifier 440. The antenna 420 optimizes the antenna radiation resistance and reactance in order to achieve a good impedance match with the rectifier 440 at a frequency of interest (e.g., about 900 MHz). The antenna 420 has improved (e.g., approximately double) bandwidth, when impedance matched to representative rectifier input impedances, over dipole and loop antennas which do not include an integrated impedance matching network, while occupying almost the same area. The loops 460*a*, 460*b* may be any shape as long each loop is each half a wavelength long at the resonant frequency. Diodes and other shapes may be connected to the loop 466. For example, rectifiers having diodes or transistors, or both, may be connected to the terminals 470*a* and 470*b*.

Figure 15:
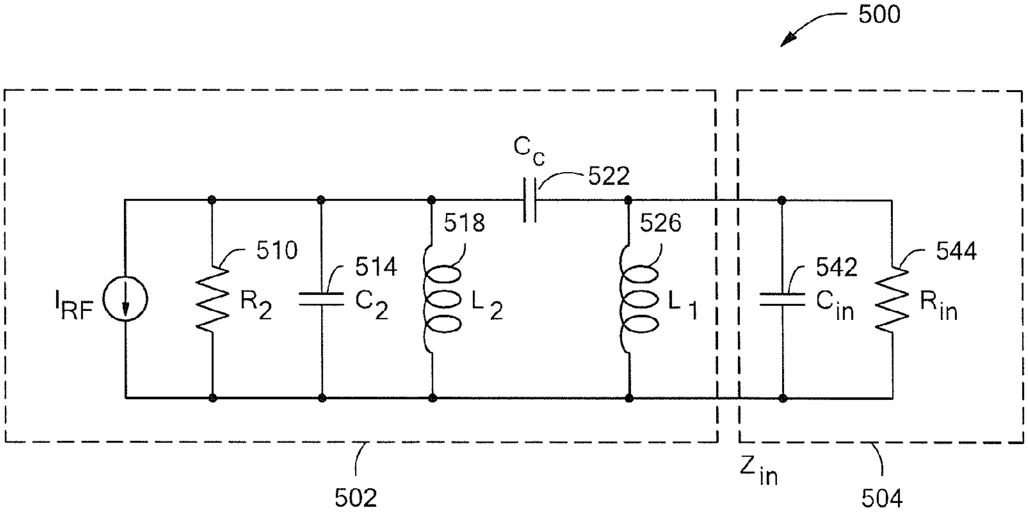
FIG. 15 is an equivalent circuit of the planar loop antenna shown in FIG. 14.

Referring to FIG. 15, the antenna 420 may be represented within an equivalent circuit 500. For example, the equivalent circuit 500 includes an antenna circuit portion 502 and a rectifier circuit portion 504. The antenna circuit portion 502 corresponds to the antenna 420 (FIG. 14). In one example, the equivalent circuit 500 is an equivalent circuit representation that is valid over small fractional bandwidths. The antenna circuit portion 502 includes a resistor 510, $R_2$, a capacitor 514, $C_2$, and an inductor 518, $L_2$, which together are equivalent to the resonant loops 460*a*, 460*b*. The antenna circuit portion 502 also includes a capacitor 522, $C_c$, corresponding to coupling 468*a*, 468*b* and an inductor 526, $L_1$, corresponding to the inductive loop 466. The antenna circuit portion 502 matches the impedance of the rectifier circuit 504 which is represented by an RC circuit including a capacitor 542, $C_{in}$, representing the rectifier input capacitance, and a resistor 544, $R_{in}$, representing the rectifier input resistance.

Figure 16:
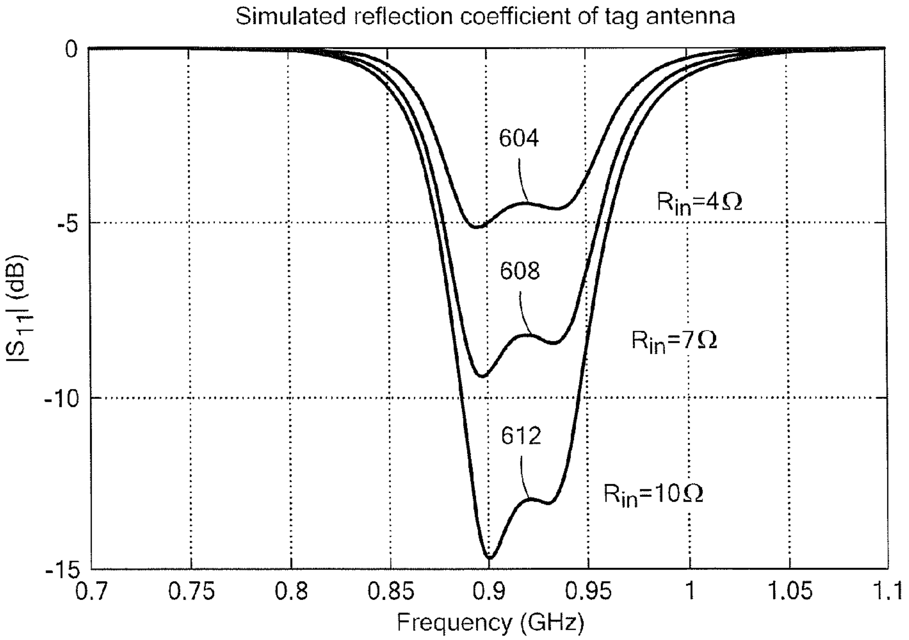
FIG. 16 is a schematic diagram of a graph of antenna input reflection characteristics vs. frequency of the equivalent circuit shown in FIG. 15.

FIG. 16 depicts examples of curves representing simulated reflection characteristics (i.e. voltage reflection coefficients) at the input of the antenna 420 for various values of rectifier input resistance, $R_{in}$, and a rectifier input capacitance, $C_{in}$ of 1 pF. For example, a curve 604 represents the simulated reflection characteristic when $R_{in}$ is equal to 4 ohms. In another example, a curve 608 represents the simulated reflection characteristic when $R_{in}$ is equal to 7 ohms. In a further example, a curve 612 represents the simulated reflection characteristic when $R_{in}$ is equal to 10 ohms.

The rectifier input capacitance, $C_{in}$, value of 1 pF is typical of rectifier chips at an operational frequency of about 900 MHz. In the FIG. 16, $S_{11}$ is the reflection coefficient of the antenna 420. The antenna 420 is impedance matched to the rectifier 440 (low value of $|S_{11}|$) at a frequency of about 900 MHz and has acceptable impedance matching bandwidth for a range of values of the rectifier input resistance $R_{in}$ indicating that the performance of the power extraction system is robust to $R_{in}$ variations. The simulation was carried out using a commercially available method of moments (MoM) based field solver. The antenna 420 occupied an area of 2.9"×2.0".

It has been found that the performance of the power extraction system is largely determined by the input capacitance $C_{in}$ of the rectifier. It can be shown that the RF voltage amplitude seen by the rectifier for given input RF power into an antenna matched to the rectifier is inversely proportional to $\sqrt{C_{in}}$. Several techniques may be used to reduce or even minimize the value of $C_{in}$. First, the rectifier circuit design may be optimized to reduce or in some cases even minimize parasitic capacitances contributed by the MOS transistors. This may include optimizing the number of gate fingers and source/drain junction areas, for example, by selecting the number of gate fingers to reduce the input capacitance, $C_{in}$ of the transistor and reducing the transistor sizes as much as possible, consistent with performance criteria of the power extraction system, i.e. as the transistor gets smaller capacitance decreases but the threshold voltage of the rectifier also increases, which is undesirable so that an optimum size is desired. Second, the circuit layout may be selected to reduce other sources of parasitic capacitance, such as capacitor bottom plate capacitance and interconnect capacitance. Other techniques may also be used, such as actively driven or floating n-wells to reduce parasitic capacitances to the chip substrate.

Figure 17:
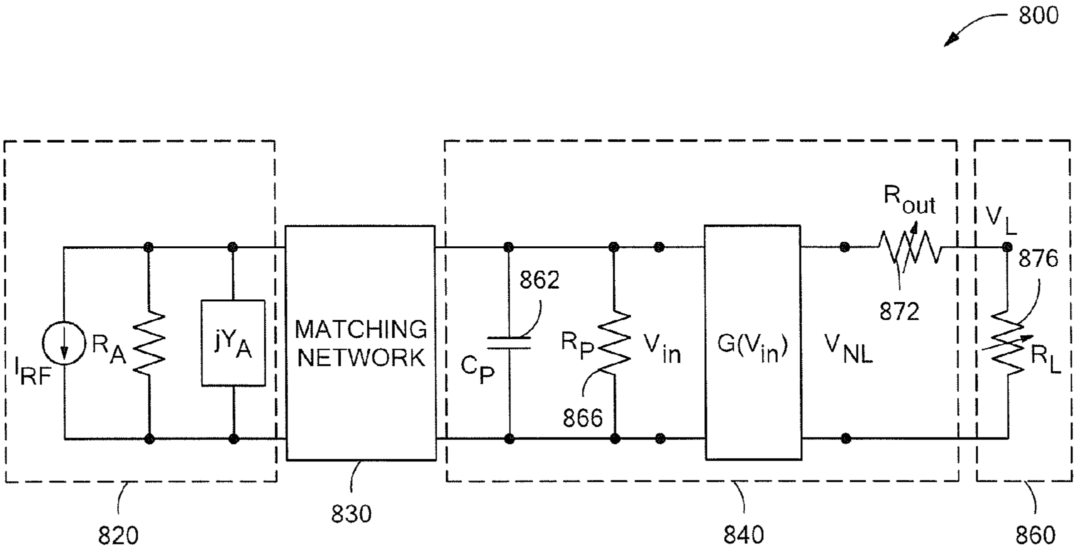
FIG. 17 is a circuit diagram modeling a power extraction system.

FIG. 17 is a circuit diagram which may be used to model an RF power extraction system coupled to a load (the system and load together denoted 800). Circuit equivalents of an antenna 820, an impedance matching network 830, a rectifier 840 and a load impedance 860 are shown, The rectifier 840 is modeled as a variable RF to DC conversion voltage gain $G(V_{in})$ having input capacitance 862, $C_P$, an input resistance 866, $R_P$, and a variable output resistance 872, $R_{out}$. The load 860 at the output of the rectifier 840 is modeled as a nonlinear (voltage dependent) resistance 876, $R_L$. The model in FIG. 17 allows one to theoretically predict the performance of the power extraction system.

Figure 18:
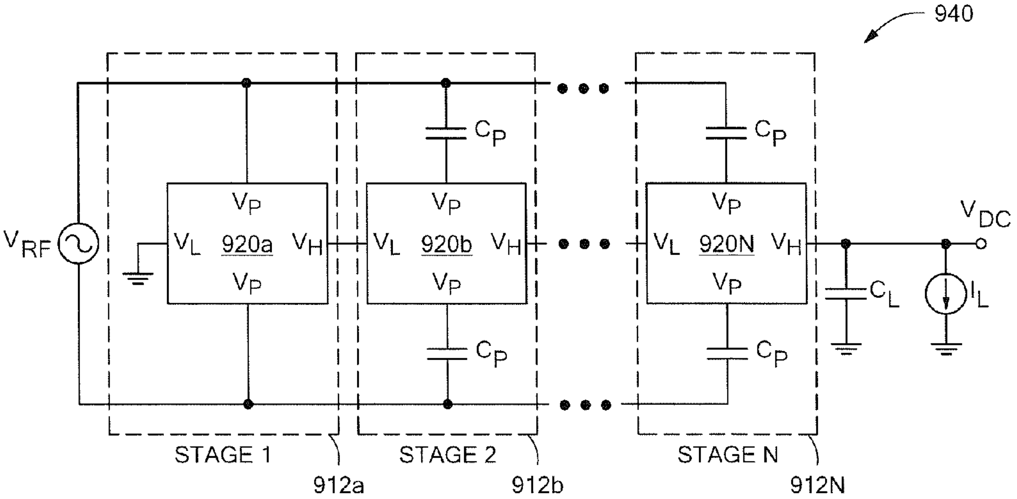
FIG. 18 is a circuit diagram of an example of a multiple-stage rectifier.

FIG. 18 is a circuit diagram 940 depicting a general architecture for multi-stage rectifier having N stages (e.g., a first stage 912*a*, a second stage 912*b*, . . . , and an Nth stage 912N). Each stage 912*a*-912N includes a rectifier cell (e.g., a rectifier cell 920*a*, a rectifier cell 920*b*, . . . , and a rectifier cell 920N) that converts RF energy to DC energy. Each cell 912*a*-912N may be formed using diodes, transistors, varactors or other nonlinear elements or any combination thereof. The input RF signal $V_{RF}$ is fed in parallel to each of the stages 912*a*-912N (directly or through pump capacitors $C_P$, e.g., pump capacitors 50) and the DC voltage produced by each stage sums in series to produce the output DC voltage $V_{DC}$ that is supplied to the load. The rectifier cell may include, for example, four transistors (see for example, FIG. 24). Using multiple stages increases the output DC voltage that can be generated from a given input RF signal and thus lowers the power up threshold and increases the operating range of the power extraction system. It should be noted that a differential RF feed is shown in FIG. 18. However, the general architecture is also applicable for a single-ended feed if one recognizes that the differential rectifier can be split into two identical single ended rectifiers operating on opposite phases of the RF cycle.

Figure 19:
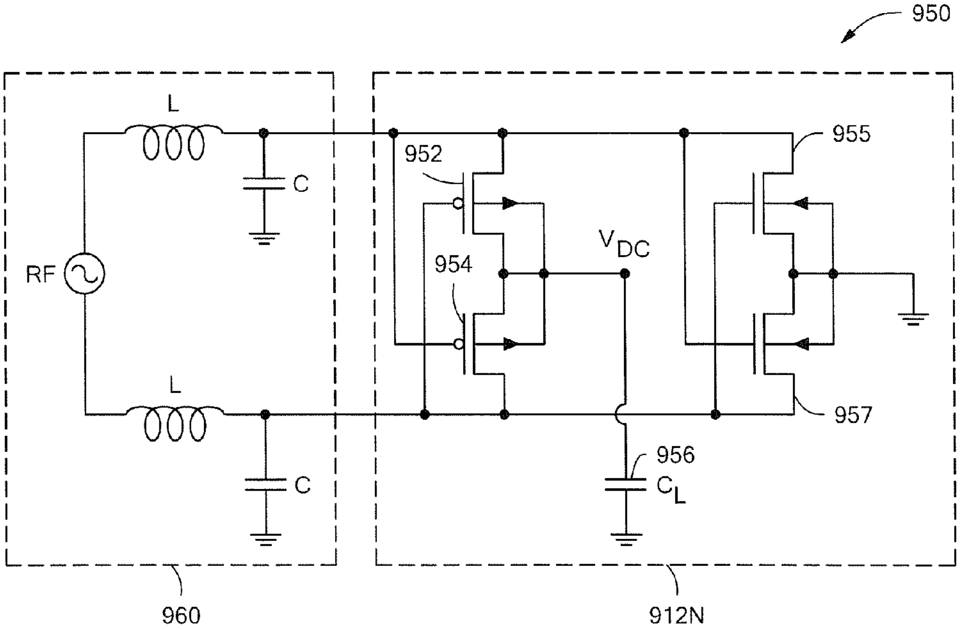
FIG. 19 is a circuit diagram of an example of a CMOS rectifier circuit.

FIG. 19 depicts an extraction system 950 having an individual rectifier stage 912N and an antenna and matching circuit 960. A CMOS circuit may be used to implement each of the individual rectifier stages 912*a*-912N shown in FIG. 18 in an efficient way. This circuit uses differential RF inputs to operate transistors as switches and thereby avoids the threshold voltage drops associated with diode rectifiers. The rectifier stage 912N 142 includes a PMOS transistor 952, a PMOS transistor 954, an NMOS transistor 955, an NMOS transistor 957 and a load capacitor $C_L$ 956. When the phase of the RF input is such that a gate of the PMOS transistor 952 is low, it turns on, drawing current from the high side of the RF input, thereby charging the load capacitor 956, $C_L$. The PMOS transistor 954 is off during this phase. During the opposite RF phase, the roles of the two transistors 952, 956 are reversed, but the load capacitor 956 is still charged. The circuit thus acts as a full wave rectifier and charges the load capacitor 956, $C_L$, towards the positive envelope of the input RF voltage $V_{RF}$ sin(ωt). The final rectified DC voltage is close to $V_{RF}$, but is lowered by the series resistance of the transistors and any finite load current being drawn by the output. MOSFET devices, being truly bidirectional devices, are ideally suitable for this circuit, where they are operated as switches This makes the integrated implementation of the circuit using standard low cost IC fabrication processes, such as CMOS, feasible.

Figure 20:
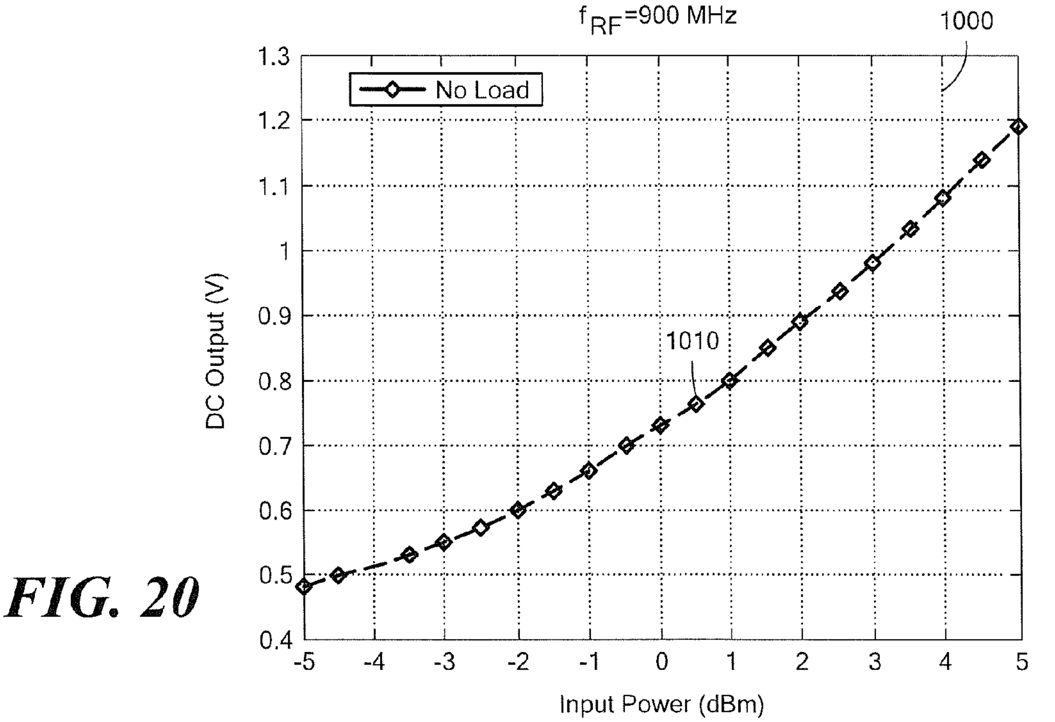
FIG. 20 is a graph of measured output DC voltage vs. input power for the CMOS rectifier circuit of FIG. 19.

FIG. 20 shows a graph 1000 of a curve 1010 of the measured output DC voltage (at no load) of the multi-stage rectifier 940 (FIG. 18) when implemented in a 0.5 μm CMOS process as a function of the input RF power level. The RF frequency is 900 MHz and is supplied by an RF signal source with an output impedance of 50Ω. The actual power delivered by the source to the rectifier is less than shown on the x-axis of FIG. 20, because the input resistance of the rectifier is much less than 50Ω (about 10Ω). Hence the actual performance of the rectifier when connected to an impedance-matched antenna is expected to be significantly better than that suggested by the curve 1010 in FIG. 20.

Figure 21:
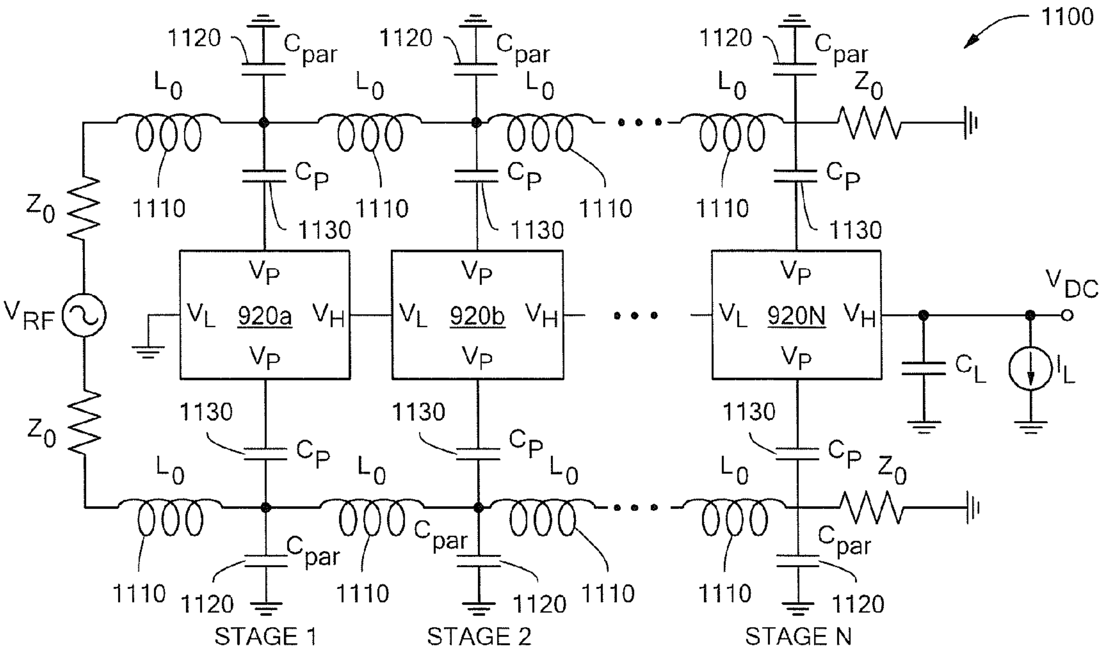
FIG. 21 is a circuit diagram of a traveling wave (distributed) rectifier.

FIG. 21 shows a generalization of the multi-stage rectifier architecture, called a "traveling wave" or ("distributed") rectifier architecture, shown in FIG. 18. By adding inductors (e.g., inductors 1110, $L_0$, between RF feeds to the rectifier stages) the parallel RF feed illustrated in FIG. 18 is converted into a lumped element transmission line.

In FIG. 21, parasitic impedances are represented by capacitors 1120, $C_{par}$, and charge pump capacitors are represented by capacitors 1130, $C_p$. Thus, in this model, the input capacitances of each rectifier stage are charged serially in time. In one embodiment, the traveling wave (distributed) rectifier architecture is analogous to the well-known traveling wave amplifier architecture.

Figure 22:
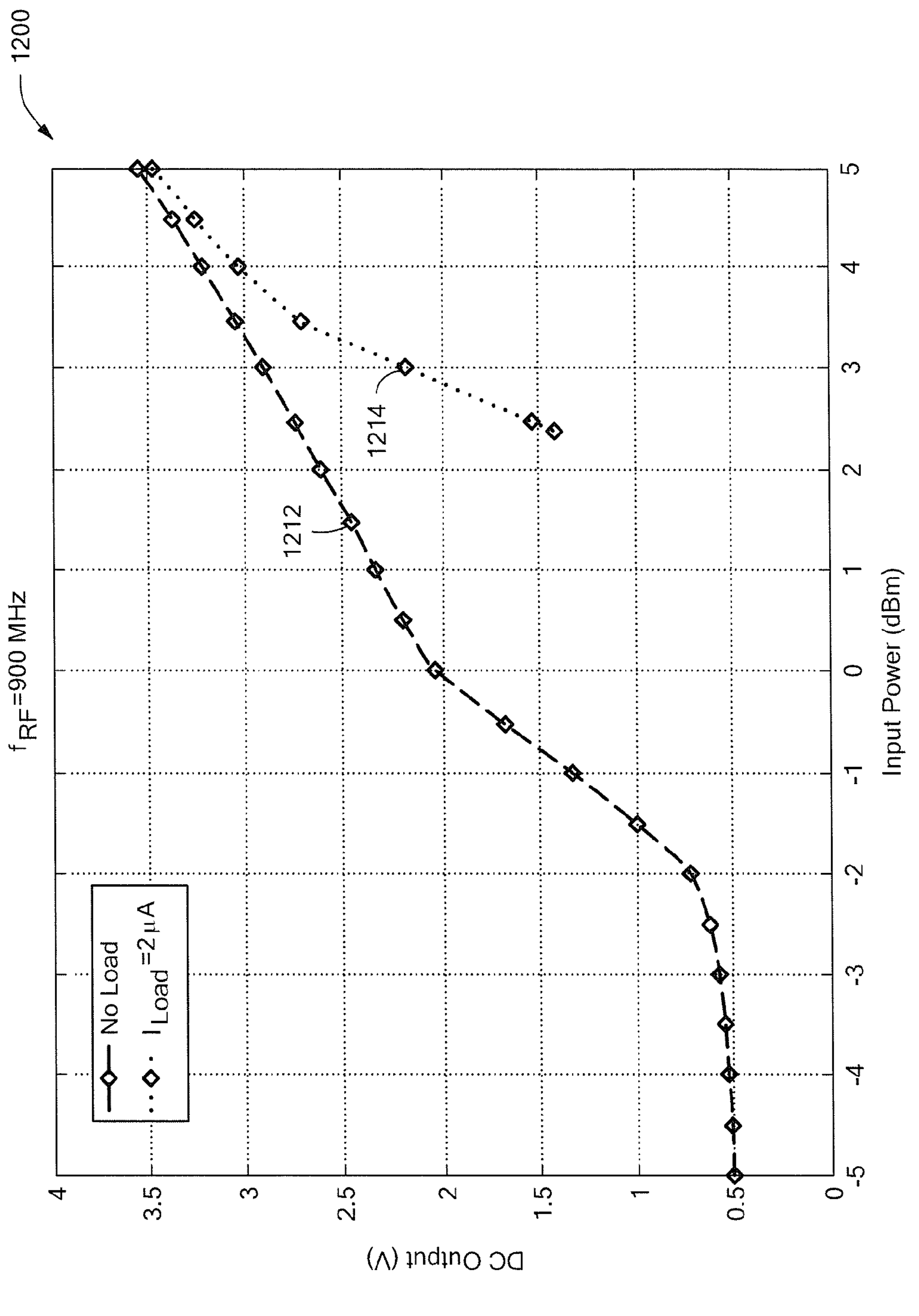
FIG. 22 is a graph of measured output DC voltage as a function of an input RF power level, of a version of the multi-stage rectifier of FIG. 18.

FIG. 22 depicts a graph 1200 having two curves 1212, 1214 of the measured output DC voltage at two different load currents as a function of the input RF power level, of a version of the rectifier architecture shown in FIG. 19 when there are five stages (N=5) and each stage is implemented using a four-transistor rectifier cell (see, for example, FIG. 25) in a 0.5 μm CMOS process. For example, curve 1212 is for a current load of 2 μA while curve 1214 is for a no load current. The curves 1212, 1214 were generated at an RF frequency of 900 MHz as supplied by an RF signal source with an output impedance of 50Ω. The actual power delivered by the RF signal source to the rectifier was less than shown on the x-axis of the figure, because the input resistance of the rectifier was much less than 50Ω (about 10Ω). Hence, the actual performance of the rectifier when connected to an impedance-matched antenna is expected to be significantly better than suggested by the curves 1212, 1214.

Figure 23:
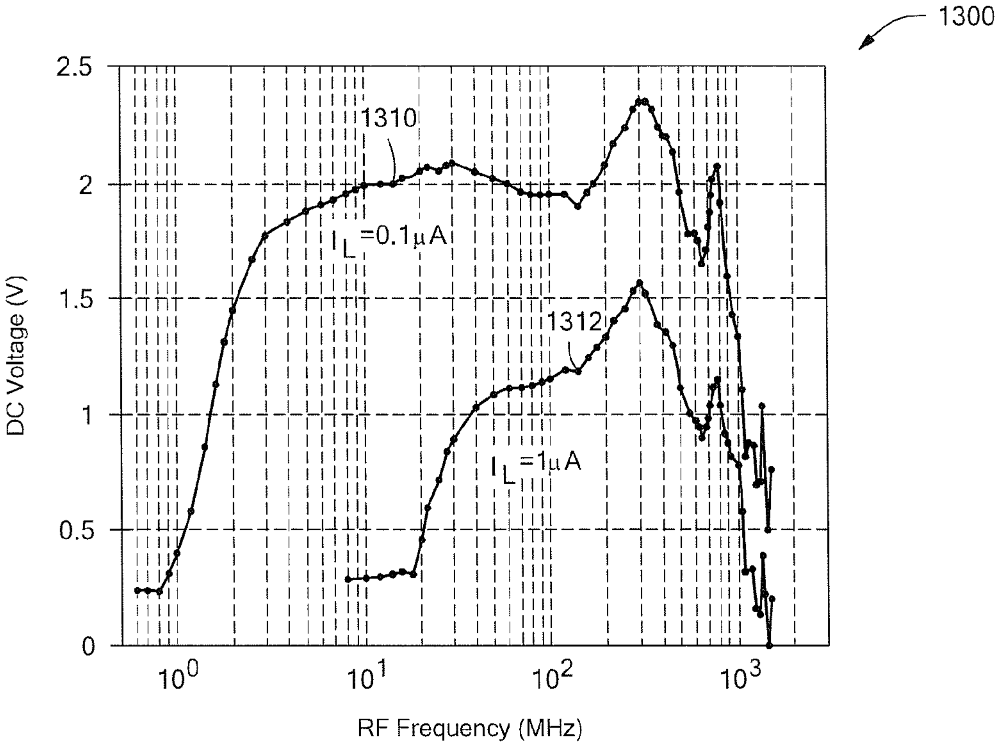
FIG. 23 is a graph of measured output voltage vs. RF frequency for a three-stage version of the multi-stage rectifier of FIG. 18.

FIG. 23 is a graph 1300 of curves 1310, 1312 depicting the measured output voltage of a three-stage version of a rectifier having an architecture as shown in FIG. 18 as a function of the input RF frequency for different load current levels. For example, curve 1310 is for a load current of 0.1 μA and curve 1312 is for a load current of 1 μA. The rectifier was implemented in a standard 0.5 μm CMOS process. As can be seen from curves 1310, 1312, the rectifier is a wideband circuit that may operate from RF frequencies less than 1.0 MHz to over 1.0 GHz.

Figure 24:
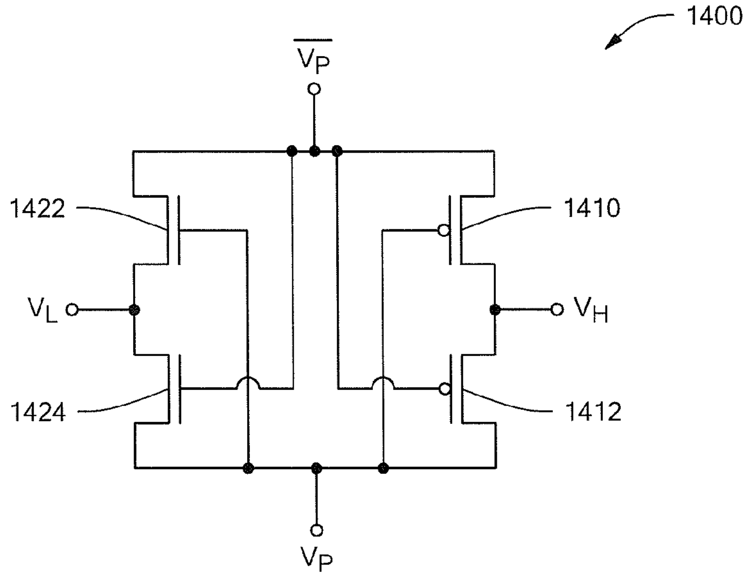
FIG. 24 is a circuit diagram of an alternate embodiment of a four-transistor cell.

FIG. 24 is an example of a four-transistor rectifier cell 1400 without the body (bulk) terminals of the MOS transistors. For example, each MOSFET has four terminals: source, drain, gate and body (bulk). In most situations that the effect of the body terminal is small and may be ignored. The four-transistor rectifier cell 1400 is an efficient way to use controlled rectifying devices (like transistors) to create rectifier structures. The four-transistor rectifier cell includes a PMOS transistor 1410, a PMOS transistor 1412, an NMOS transistor 1422 and an NMOS transistor 1424. $V_P$ and $\overline{V}_P$ are the AC terminals. These terminals are connected to the differential RF signal either directly or capacitively (e.g. through $C_P$ not shown). Capacitive coupling allows the DC voltages at $V_P$ and $\overline{V}_P$ to be controlled independently of the DC voltage of the RF input, thus allowing large voltages to be built up at $V_H$ and $V_L$ terminals, which are the high and low DC voltages, respectively. This is needed for the multi-stage rectifier architecture shown in FIG. 18. If all the transistors are replaced with two terminal devices like diodes, the cell reduces to the well-known full diode bridge circuit.

Figure 25:
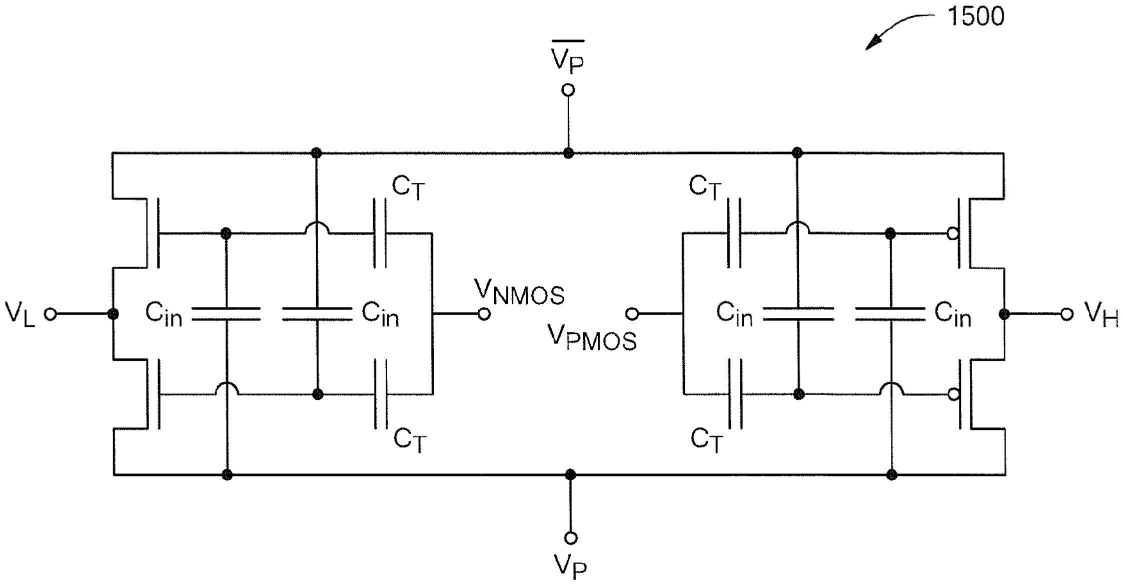
FIG. 25 is a circuit diagram of a floating gate, capacitively coupled version of the four-transistor CMOS rectifier cell.

FIG. 25 depicts a floating gate version of the four-transistor rectifier cell. Transistor body (bulk) terminals are not shown. RF is directly connected or capacitively coupled between $V_P$ and $\overline{V}_P$. For example, the RF input signal is either directly connected between these terminals or fed in through pump capacitors $C_P$ connected to these terminals (e.g., in FIGS. 8 and 18). The capacitors $C_{in}$ are then used to couple the input RF signal into the transistor gates and the capacitance valves of capacitors $C_{in}$ are selected to be much larger than the capacitance valves of the capacitors $C_T$.

Using floating gate transistors for adaptively adjusting threshold voltages and resonant frequencies one may adaptively adjust the power extraction system for optimal performance by using floating gate transistors as adaptive elements. The threshold voltage of floating gate transistors can be changed by adding or subtracting charge from the floating gate. A lower threshold voltage improves the performance of the switched rectifier and charge pumps described in the following sections by increasing the rectified current for a given input RF amplitude. However, the threshold voltage cannot be made very low since then the switches start conducting more symmetrically, i.e., the reverse current increases and they never switch off completely. This hurts the rectification efficiency. Thus, for a particular rectifier topology, there exists an optimum threshold voltage, which is also a function of RF input amplitude and load current. The optimum threshold increases with the RF amplitude and decreases with load current.

In this implementation, $C_T$ is a parallel plate capacitor with polysilicon top and bottom plates and a thin layer of silicon dioxide as the dielectric material. The large programming voltages generate high electric fields across the thin dielectric, leading to quantum mechanical tunneling of electrons through it and allowing one to add or subtract charge at the floating gate nodes of the transistors, thus effectively changing their threshold voltages. This process is known as Fowler-Nordheim (F-N) tunneling. This process allows bidirectional electron flow across the dielectric, thus allowing complete control of the threshold voltages of both PMOS and NMOS transistors.

The programming process is combined with a suitable function maximization strategy, such as the uphill simplex method, in order to find the optimum threshold voltage for the rectifier. Experimentally, this optimum is found to be a function of the load current and the RF input amplitude. The optimization process is as follows: the programming voltages $V_{NMOS}$ and $V_{PMOS}$ of all the switched rectifiers and charge pump cells in the circuit are tied together with the goal is to maximize the output DC voltage at the specified load current and at the minimum input RF amplitude of interest. It is assumed that known tunneling currents $I_{NMOS}$ and $I_{PMOS}$ flow for given values of $V_{NMOS}$ and $V_{PMOS}$ (these may be determined experimentally). If the total capacitance $C_{tot}$ at the floating gate node ($C_{tot} \approx C_{in}+C_T$) is known, the threshold voltage changes at the NMOS and PMOS gate caused by applying $V_{NMOS}$ and $V_{PMOS}$ for a fixed time Tare simply $$\Delta V_N = \frac{I_{NMOS}T}{C_{tot}} \text{ and } \Delta V_P = \frac{I_{PMOS}T}{C_{tot}},$$

respectively. By discretizing the two-dimensional threshold voltage plane (for the NMOS and PMOS transistors) using $\Delta V_N$ and $\Delta V_P$ as units and using an optimization algorithm such as simplex, one can find the optimal threshold voltages for the circuit. The optimum point can be found accurately if the time period T is made small, so that $\Delta V_N$ and $\Delta V_P$ are small.

The size of the input coupling capacitor $C_{in}$ may be optimized. For example, $C_{in}$ is much larger than $C_T$ to minimize capacitive voltage division of the input signal at the floating gate, but cannot be made indefinitely large, because of its associated bottom plate parasitic capacitance, which begins to increase the input capacitance of the rectifier as $C_{in}$ increases.

The number of stages may be optimized in the rectifier. Increasing the number of stages increases the output DC voltage for given RF input amplitude, but also simultaneously increases the input capacitance. Again, an optimal number of stages exist that maximizes the output DC voltage at the specified load current for a given input RF power level. The optimum number may be found in an impedance model of each switched cell stage and using numeric optimization techniques.

Figure 26:
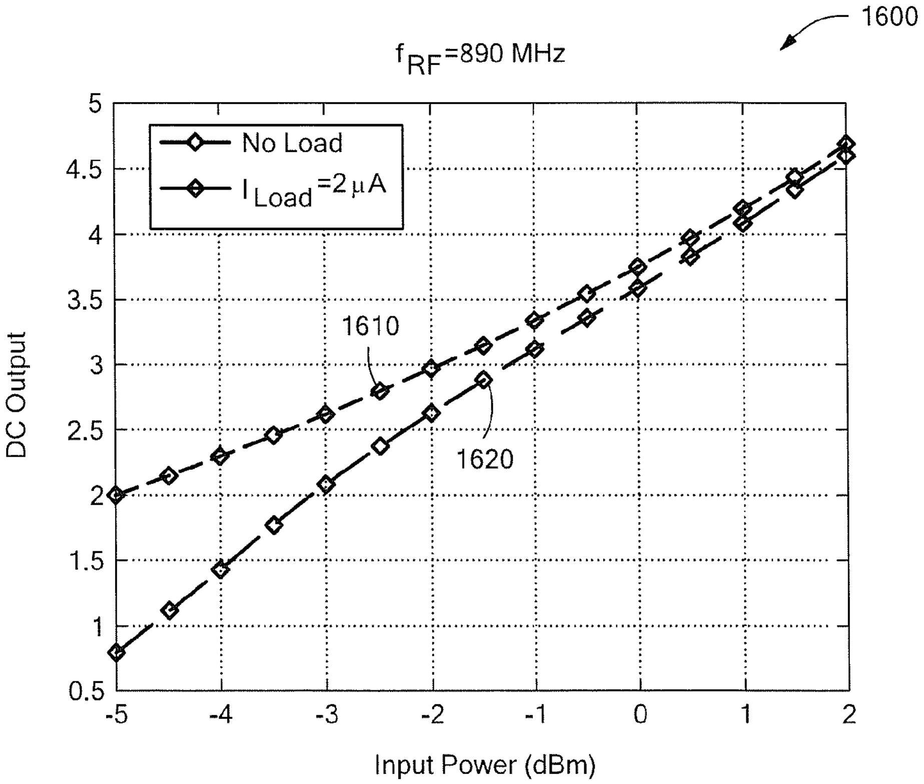
FIG. 26 is a graph of measured output DC voltage vs. input power for a floating gate circuit of the type shown in FIG. 25 having five stages.

FIG. 26 depicts a graph 1600 of curves 1610, 1620 indicating the measured output DC voltage from the floating gate rectifier at a frequency of 890 MHz as a function of input RF power level for two different load currents. For example, curve 1610 is for a current load of 2 μA and curve 1620 is for a no load current, The circuit was implemented in a 0.5 μm CMOS process and threshold voltage programming was carried out. The system comprised a five-stage implementation of the rectifier architecture shown in FIG. 18. Each stage was implemented using the floating gate rectifier cell shown in FIG. 25. The RF signal was taken from the 50Ω output of a RF signal generator; the measured Q at the input was about 1.5 at the frequency of operation. The actual power delivered by the source to the rectifier was less than shown on the x-axis of the figure, because the input resistance of the rectifier was much less than 50Ω (about 10Ω). Hence the actual performance of the rectifier when connected to an impedance-matched antenna is expected to be significantly better than that suggested by curves 1610, 1620.

Figure 27:
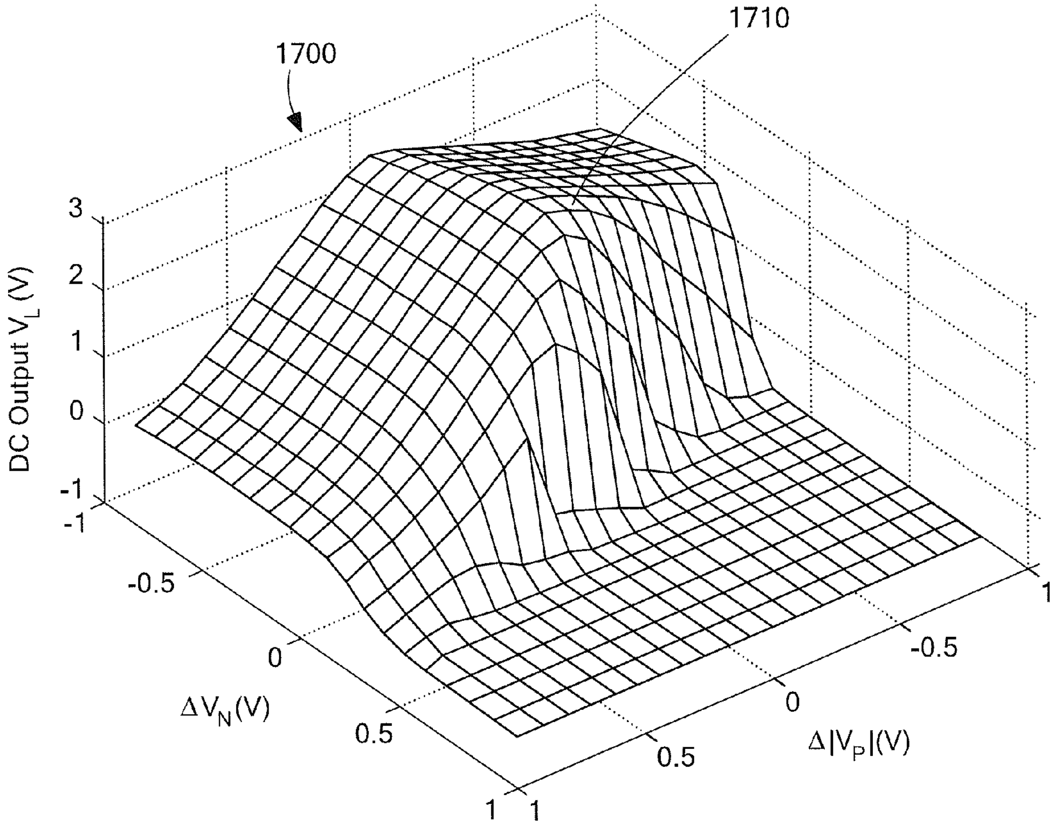
FIG. 27 is a three-dimensional graph of NMOS threshold voltages and PMOS threshold voltages as a function of an output DC voltage for a five-stage rectifier having floating gate rectifier cells of the type shown in FIG. 25.

FIG. 27 is a three-dimensional plot 1700 depicting the effect of changing NMOS and PMOS threshold voltages on the output DC voltage of the same rectifier used to construct FIG. 26. There exists an optimum pair of NMOS and PMOS threshold voltages that maximizes the output DC voltage. Finding this optimum point is the goal of the rectifier programming strategies, for example, at a point 1710 where the DC output is the highest.

Figure 28:
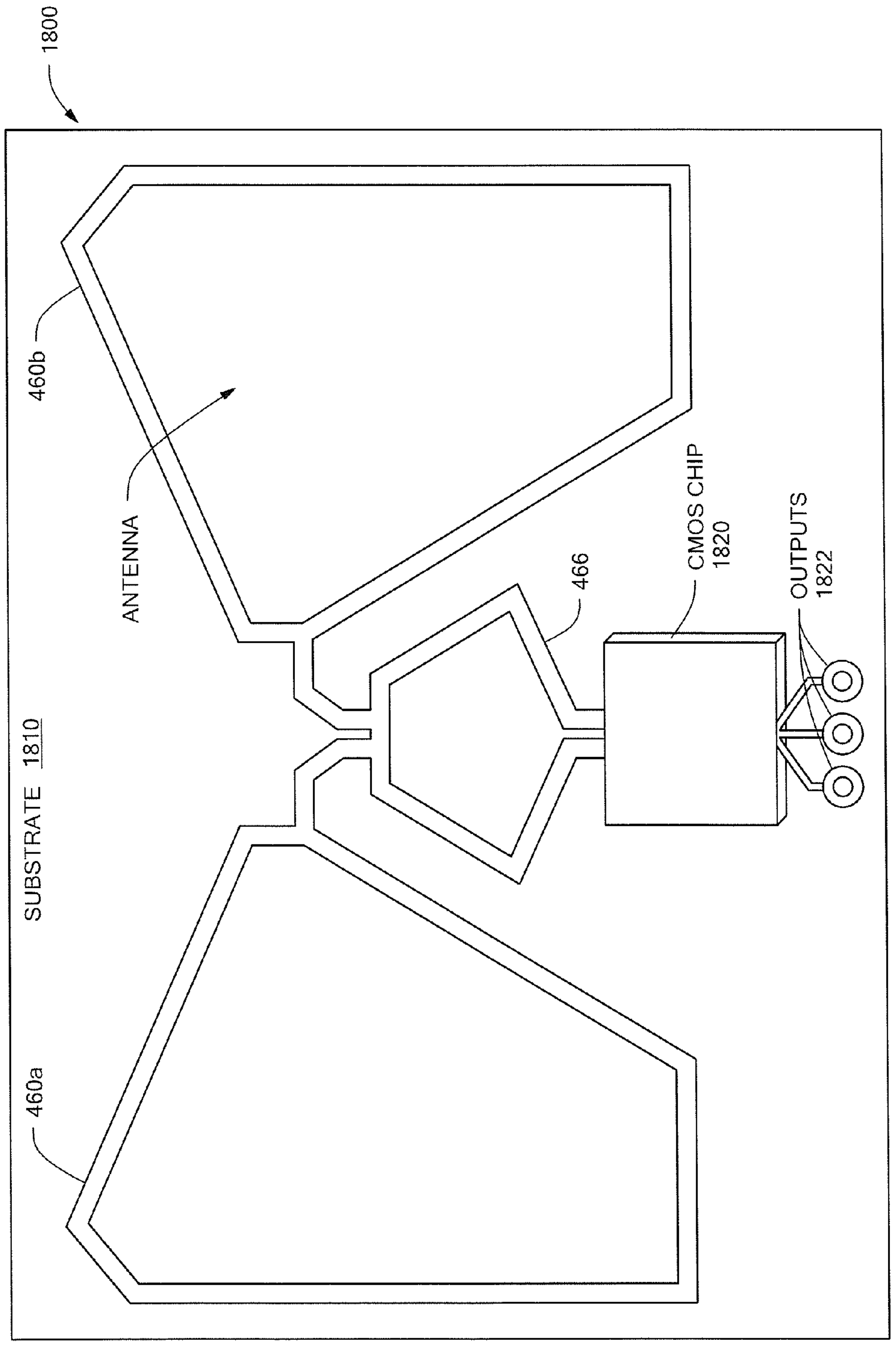
FIG. 28 is an embodiment of an RF power extraction system.

FIG. 28 is a diagram of a working RF power extraction system prototype 1800 that measures 2.9"×2.0" which is the size of a substrate 1810 on which the antenna 420 and associated circuits are disposed. In one example, the substrate 1810 is a printed circuit board having FR-4 material. FR-4 is a standard dielectric material commonly used for making printed circuit boards. It is rigid (not flexible) but inexpensive. The prototype 1800 operates at UHF around 900 MHz. The prototype 1800 includes the antenna components (e.g., antenna 420 from FIG. 14) such as the resonant loop 460*a*, the resonant loop 460*b*, the inductive loop 466 and corresponding connectors 468*a*, 466*b*. The prototype 1800 also includes an RFID CMOS chip 1820 connected to the inductive loop 466. The RFID CMOS chip 1820 is connected to output terminals 1822 for off-substrate access to RFID CMOS chip 1820 signal output.

Figure 29:
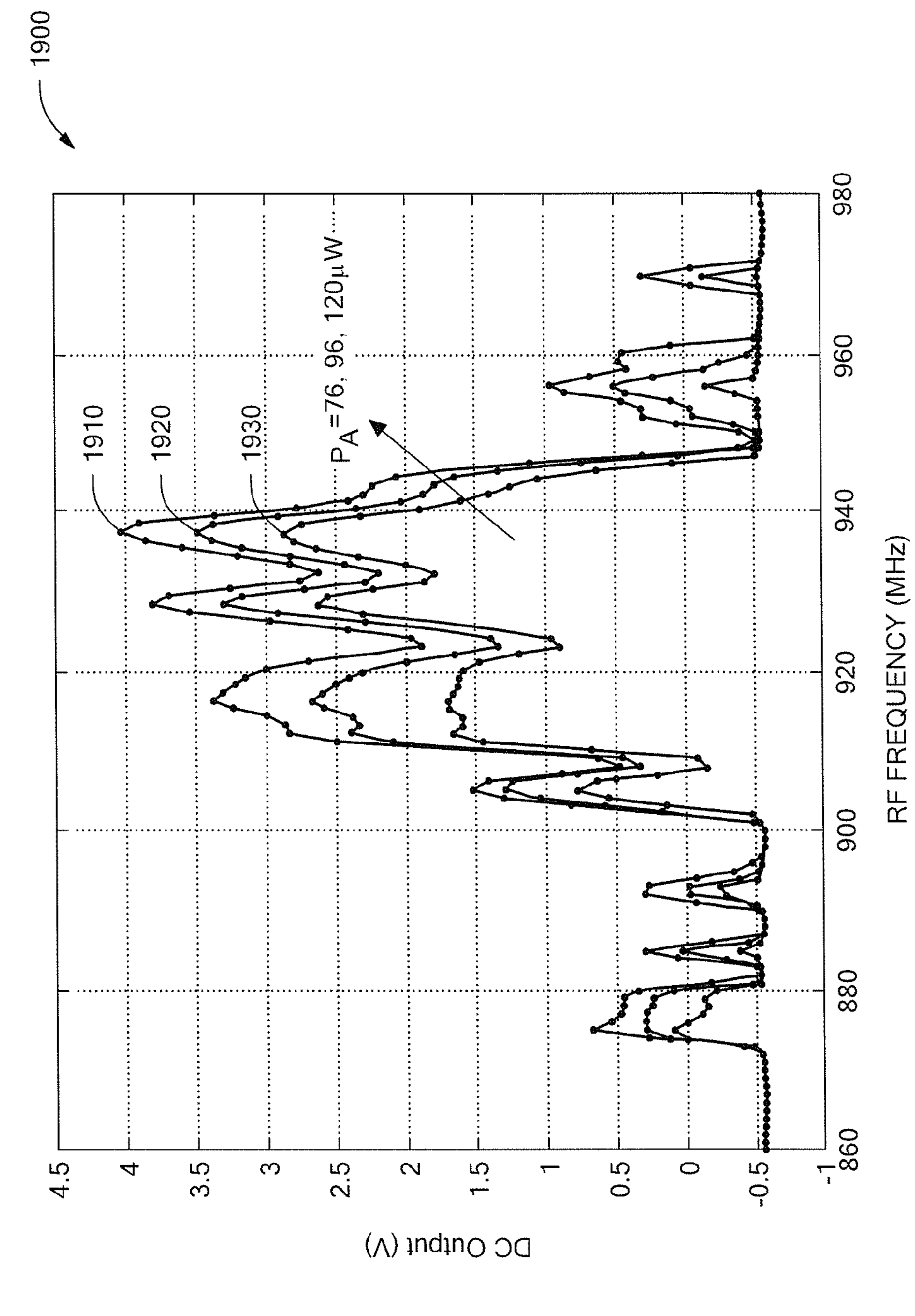
FIG. 29 is a graph of DC output voltage produced by the RF power extraction system shown in FIG. 28 as a function of input RF frequency for different incident RF power levels and 2 μA load current.

FIG. 29 is a graph 1900 that shows measured curves of the output DC voltage produced by the RF power extraction system shown in FIG. 28 as a function of the input RF frequency for different incident RF power levels and 2 μA load current. For example, a curve 1910 is for an input power level, $P_A$, of 120 μW a curve 1920 represents an input power level, $P_A$, of 96 μW, and a curve 1930 is for an input power level, $P_A$, of 76 μW. The curves 1910, 1920, 1930 are frequency sweeps that show that the system is working: the rectifier is supplying a fixed DC current (2 μA) to the load, Each curve corresponds to a different input RF power level. The load voltage is the y-axis on these plots. A higher load voltage means higher output power, so higher efficiency for the same input RF power level. The curves all reach maximum values around 930 MHz, which is where the system is resonant & impedance matched and therefore operates most efficiently.

Figure 30:
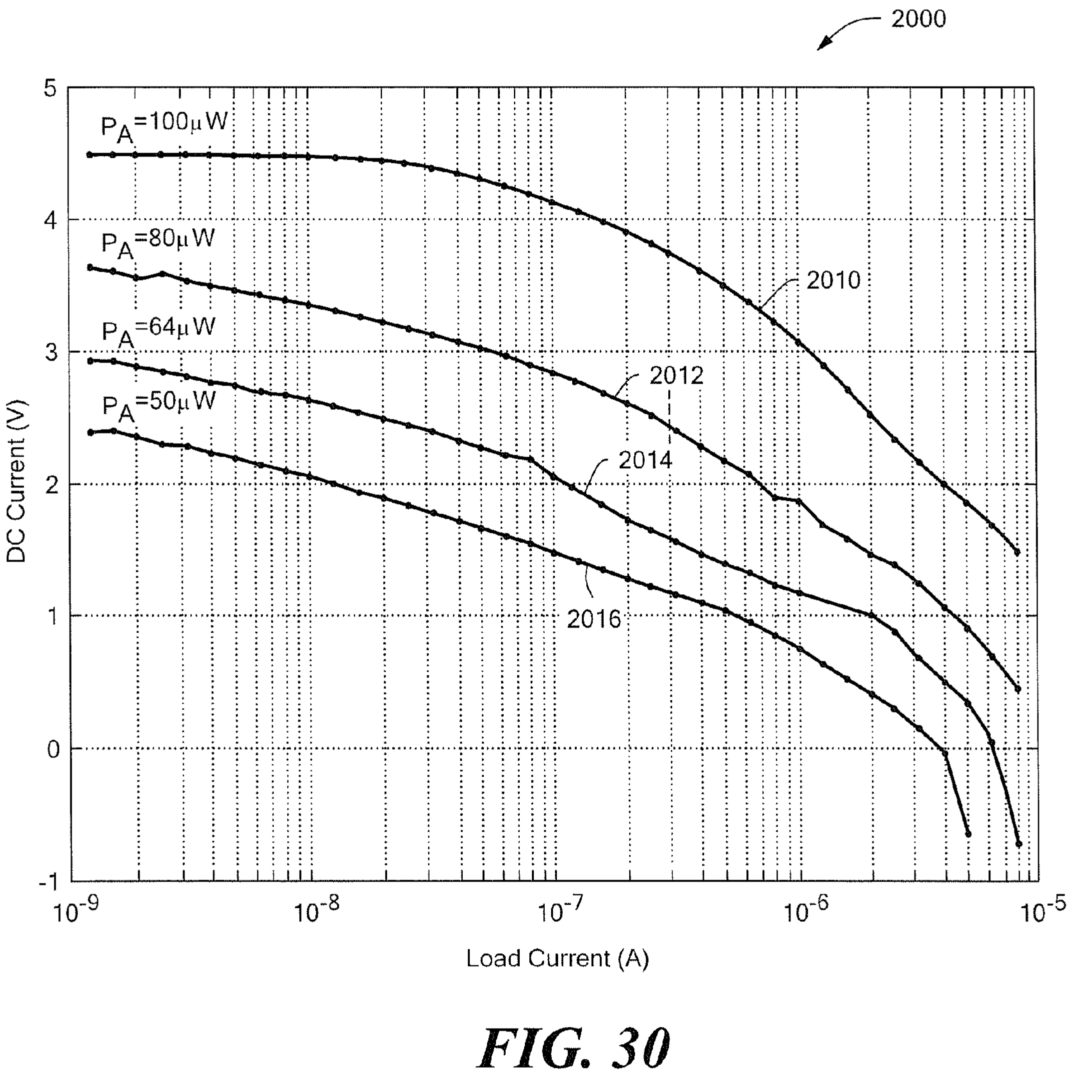
FIG. 30 is a graph of measured curves of the output DC voltage produced by the RF power extraction system shown in FIG. 28 as a function of the load current for different RF power levels and an input RF frequency of 920 MHz.

FIG. 30 is a graph 2000 showing measured curves of the output DC voltage produced by the RF power extraction system shown in FIG. 28 as a function of the load current for different input RF power levels and an RF frequency of 920 MHz. For example, a load curve 2010 represents an input power level, $P_A$, of 100 μW, a load curve 2012 represents an input power level, $P_A$, of 80 μW, a load curve 2014 represents an input power level, $P_A$, of 64 μW, and a load curve 2016 represents an input power level, $P_A$, of 50 μW. The load curves 2010, 2012, 2014, 2016 were measured by keeping the input RE frequency fixed at 920 MHz but varying the DC load current placed at the output of the power extraction system. Each curve 2010, 2012, 2014, 2016 corresponds to a different input RF power level. Again, these show experimentally that the system works. The curves droop downward as the load current increases because of the finite output impedance of the rectifier.

The present application has provided several examples of RFID tags operating in the UHF frequency band since it is of commercial importance, but the applicability of the techniques and systems described herein are not confined to the RFID use or the VHF frequency band. Since the techniques and systems may be applied to a fairly general nature, the innovations described herein may be applied over a broad range of RF frequencies and power levels for various self-powered applications.

Currently, the minimum RF power threshold for self powered devices is in the 50-60 μW range. By way of implementing one or more of the techniques and circuits described above, this threshold is reduced to 3 μW or below. This results in a concomitant increase in the maximum read range by a factor of 4 over current designs.

Having described embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A far-field power extraction circuit comprising:

an antenna comprising:

an inductive loop;

two impedance inverters each coupled to the inductive loop; and two resonant loops each coupled to a respective one of the two impedance inverters, the antenna configured to receive an electromagnetic signal, said antenna having a resonant frequency and configured to subsequently match an antenna impedance with a remainder of the far-field power extraction circuit at the resonant frequency; and a multi-stage rectifier coupled to the antenna, the multi-stage rectifier adapted to receive an electromagnetic signal from the antenna and in response thereto, to produce a direct current (DC) voltage at a rectifier output, the multi-stage rectifier comprising N stages, where N >1, wherein the multi-stage rectifier comprises at least one circuit element having a nonlinear capacitance characteristic and at least one inductor between each of the rectifier stages.

2. The circuit of claim 1 wherein each of the two resonant loops has a perimeter substantially equal to one-half wavelength at the resonant frequency.

3. The circuit of claim 1 wherein a first rectifier stage of the N rectifier stages includes four transistors.

4. The circuit of claim 3 wherein the four transistors comprise two p-type metal-oxide-semiconductor (PMOS) transistors.

5. The circuit of claim 4 wherein the four transistors comprise two n-type metal-oxide-semiconductor (NMOS) transistors.

6. The circuit of claim 3 wherein the four transistors comprises a floating gate transistor.

7. The circuit of claim 1 wherein the antenna is provided having a size and shape such that it is resonant at a frequency of about 900 MHz.

8. The circuit of claim 1, further comprising a feedback tuning network coupled between the antenna and a terminal of the rectifier at which a voltage is generated.

* * * * *

UNITED STATES PATENT AND TRADEMARK OFFICE

CERTIFICATE OF CORRECTION

PATENT NO. : 8,045,947 B2
APPLICATION NO. : 11/609060
DATED : October 25, 2011
INVENTOR(S) : Soumyajit Mandal et al.

It is certified that error appears in the above-identified patent and that said Letters Patent is hereby corrected as shown below:

Column 8, line 59 delete “a drain couple dot the” and replace with --a drain coupled to the--

Column 9, line 17 delete “networks” and replace with --network--

Column 9, line 52 delete “for given” and replace with --for a given--

Column 10, line 32 delete “as long each” and replace with --as long as each--

Column 10, line 48 delete “coupling” and replace with --connectors--

Column 11, line 45 delete “for” and replace with --for a--

Column 11, line 64 delete “single ended” and replace with --single-ended--

Column 12, line 21 delete “switches this” and replace with --switches. This--

Column 13, line 51 delete “then the” and replace with --the--

Column 14, line 11 delete “is to” and replace with --to--

Column 15, line 30 delete “a” and replace with --, a--

Column 15, line 39 delete “&” and replace with --and--

Column 15, line 51 delete “RE” and replace with --RF--

Column 16, line 15 delete “that that” and replace with --that--

Signed and Sealed this
Tenth Day of April, 2012

David J. Kappos

David J. Kappos
*Director of the United States Patent and Trademark Office*